(12) United States Patent
Allam

(10) Patent No.: US 12,139,405 B2
(45) Date of Patent: Nov. 12, 2024

(54) APPARATUSES AND METHODS FOR HYDROGEN PRODUCTION

(71) Applicant: 8 Rivers Capital, LLC, Durham, NC (US)

(72) Inventor: Rodney John Allam, Wiltshire (GB)

(73) Assignee: 8 Rivers Capital, LLC, Durham, NC (US)

( * ) Notice: Subject to any disclaimer, the term of this patent is extended or adjusted under 35 U.S.C. 154(b) by 0 days.

(21) Appl. No.: 18/208,513

(22) Filed: Jun. 12, 2023

(65) Prior Publication Data

US 2023/0322553 A1    Oct. 12, 2023

Related U.S. Application Data

(63) Continuation of application No. 17/990,443, filed on Nov. 18, 2022, now Pat. No. 11,691,874.

(60) Provisional application No. 63/280,761, filed on Nov. 18, 2021, provisional application No. 63/280,774, filed on Nov. 18, 2021, provisional application No. 63/280,786, filed on Nov. 18, 2021, provisional application No. 63/280,793, filed on Nov. 18, 2021, (Continued)

(51) Int. Cl.
*C01B 3/38*          (2006.01)
*C01B 3/50*          (2006.01)

(52) U.S. Cl.
CPC .............. *C01B 3/388* (2013.01); *C01B 3/382* (2013.01); *C01B 3/508* (2013.01); *C01B 2203/0233* (2013.01); *C01B 2203/0425* (2013.01); *C01B 2203/0475* (2013.01); *C01B 2203/068* (2013.01); *C01B 2203/0811* (2013.01); *C01B 2203/1235* (2013.01); *C01B 2203/1638* (2013.01); *C01B 2210/001* (2013.01); *C01B 2210/0051* (2013.01)

(58) Field of Classification Search
CPC .. C01B 3/56; C01B 3/32; C01B 3/501; C01B 3/52; C01B 2203/0227; C01B 2203/0405; C01B 2203/0415; C01B 2203/042; C01B 2203/0475; C01B 2203/0822; B01J 19/0013; B01J 2219/00157; C10J 3/82; C10J 2300/1612; H01M 8/0618; C10K 1/005; Y02E 60/50
See application file for complete search history.

(56) References Cited

U.S. PATENT DOCUMENTS

| 4,185,456 | A | 1/1980 | Cummings |
| 4,498,289 | A | 2/1985 | Osgerby |
| 4,725,380 | A | 2/1988 | Pinto |

(Continued)

FOREIGN PATENT DOCUMENTS

| DE | 10 2009 032 718 | 2/2011 |
| KR | 2011-0133782 | 12/2011 |

(Continued)

*Primary Examiner* — Wayne A Langel
*Assistant Examiner* — Syed T Iqbal
(74) *Attorney, Agent, or Firm* — Womble Bond Dickinson (US) LLP

(57) ABSTRACT

The present disclosure provides systems and methods for hydrogen production as well as apparatuses useful in such systems and methods. Hydrogen is produced by steam reforming of a hydrocarbon in a gas heated reformer that is heated using one or more streams comprising combustion products of a fuel in an oxidant, preferably in the presence of a carbon dioxide circulating stream.

19 Claims, 10 Drawing Sheets

Related U.S. Application Data provisional application No. 63/423,301, filed on Nov. 7, 2022.

(56) References Cited

U.S. PATENT DOCUMENTS

| | | |
|---|---|---|
| 6,214,066 B1 | 4/2001 | Nataraj et al. |
| 6,296,814 B1 * | 10/2001 | Bonk ................. B01J 8/008 422/651 |
| 6,301,927 B1 | 10/2001 | Reddy |
| 6,474,069 B1 | 11/2002 | Smith |
| 6,500,241 B2 | 12/2002 | Reddy |
| 6,534,551 B2 | 3/2003 | Allam et al. |
| 6,932,958 B2 | 8/2005 | Wangerow et al. |
| 6,946,016 B2 | 9/2005 | Reddy |
| 6,966,171 B2 | 11/2005 | Uematsu et al. |
| 7,056,480 B2 | 6/2006 | Ogawa |
| 7,089,727 B2 | 8/2006 | Schütz |
| 7,138,001 B2 | 11/2006 | Knez et al. |
| 7,179,324 B2 | 2/2007 | Baksh et al. |
| 7,182,917 B2 | 2/2007 | Krueger |
| 7,182,921 B2 | 2/2007 | Miura et al. |
| 7,192,569 B2 | 3/2007 | Stewart |
| 7,220,505 B2 | 5/2007 | Malhotra et al. |
| 7,247,656 B2 | 7/2007 | Guo et al. |
| 7,252,692 B2 | 8/2007 | Rei |
| 7,326,482 B2 | 2/2008 | Haltiner, Jr. et al. |
| 7,341,609 B2 | 3/2008 | DeVries |
| 7,393,382 B2 | 7/2008 | Givens |
| 7,399,342 B2 | 7/2008 | Bizjak |
| 7,404,846 B2 | 7/2008 | Golden et al. |
| 7,419,648 B2 | 9/2008 | Kuipers et al. |
| 7,427,368 B2 | 9/2008 | Drnevich |
| 7,550,215 B2 | 6/2009 | Malhotra et al. |
| 7,574,855 B2 | 8/2009 | Benz et al. |
| 7,611,676 B2 | 11/2009 | Inage et al. |
| 7,628,963 B2 | 12/2009 | Woo et al. |
| 7,635,399 B2 | 12/2009 | Su |
| 7,686,856 B2 | 3/2010 | Hemmings et al. |
| 7,695,708 B2 | 4/2010 | Peng et al. |
| 7,708,812 B2 | 5/2010 | Shinkai et al. |
| 7,727,509 B2 | 6/2010 | Abbott et al. |
| 7,731,935 B2 | 6/2010 | Brady et al. |
| 7,763,086 B2 | 7/2010 | Woods et al. |
| 7,763,098 B2 | 7/2010 | Alizadeh-Khiavi et al. |
| 7,815,892 B2 | 10/2010 | Hershkowitz et al. |
| 7,828,864 B2 | 11/2010 | Edlund et al. |
| 7,833,311 B2 | 11/2010 | Givens |
| 7,833,326 B2 | 11/2010 | Bizjak |
| 7,837,765 B2 | 11/2010 | Adams et al. |
| 7,837,973 B2 | 11/2010 | Snyder et al. |
| 7,883,672 B2 | 2/2011 | Woo et al. |
| 7,908,842 B2 | 3/2011 | Eroglu et al. |
| 7,914,764 B2 | 3/2011 | Hershkowitz et al. |
| 7,931,888 B2 | 4/2011 | Drnevich et al. |
| 7,932,296 B2 | 4/2011 | Malhotra et al. |
| 7,950,239 B2 | 5/2011 | Lilley et al. |
| 7,960,441 B2 | 6/2011 | Wolf |
| 7,985,399 B2 | 7/2011 | Drnevich et al. |
| 7,988,948 B2 | 8/2011 | Guvelioglu et al. |
| 8,021,464 B2 | 9/2011 | Gauthier et al. |
| 8,025,862 B2 | 9/2011 | Rojey et al. |
| 8,034,321 B2 | 10/2011 | Mauthner et al. |
| 8,038,748 B2 | 10/2011 | Edlund |
| 8,038,771 B2 | 10/2011 | Bizjak |
| 8,070,841 B2 | 12/2011 | Adams et al. |
| 8,080,070 B2 | 12/2011 | Grover |
| 8,097,371 B2 | 1/2012 | Suehiro et al. |
| 8,110,022 B2 | 2/2012 | DeVries |
| 8,124,049 B2 | 2/2012 | Grover |
| 8,137,422 B2 | 3/2012 | Licht et al. |
| 8,177,868 B2 | 5/2012 | Johnston |
| 8,187,363 B2 | 5/2012 | Grover |
| 8,206,669 B2 | 6/2012 | Schaffer et al. |
| 8,240,370 B2 | 8/2012 | Palamara et al. |
| 8,257,452 B2 | 9/2012 | Menzel |
| 8,257,668 B2 | 9/2012 | Mukai et al. |
| 8,263,274 B2 | 9/2012 | Sonnichsen et al. |
| 8,268,024 B2 | 9/2012 | Price |
| 8,273,139 B2 | 9/2012 | Malhotra et al. |
| 8,273,489 B2 | 9/2012 | Ukai et al. |
| 8,287,763 B2 | 10/2012 | Pham et al. |
| 8,303,930 B2 | 11/2012 | Chen et al. |
| 8,375,723 B2 | 2/2013 | Benz et al. |
| 8,394,174 B2 | 3/2013 | Chen et al. |
| 8,414,666 B2 | 4/2013 | Palamara et al. |
| 8,419,829 B2 | 4/2013 | Wallace |
| 8,449,633 B2 | 5/2013 | Pham et al. |
| 8,449,649 B2 | 5/2013 | Greenough |
| 8,460,630 B2 | 6/2013 | Niitsuma et al. |
| 8,486,180 B2 | 7/2013 | Chen |
| 8,535,638 B2 | 9/2013 | Terrien et al. |
| 8,551,217 B2 | 10/2013 | Baksh et al. |
| 8,596,075 B2 | 12/2013 | Allam et al. |
| 8,597,383 B2 | 12/2013 | Pham et al. |
| 8,617,294 B2 | 12/2013 | Adams et al. |
| 8,623,563 B2 | 1/2014 | Anzai |
| 8,636,922 B2 | 1/2014 | Grover et al. |
| 8,671,688 B2 | 3/2014 | Rogers et al. |
| 8,673,135 B2 | 3/2014 | Colyar et al. |
| 8,685,282 B2 | 4/2014 | Iaquaniello |
| 8,685,358 B2 | 4/2014 | Allam |
| 8,690,972 B2 | 4/2014 | Takata et al. |
| 8,692,034 B2 | 4/2014 | Han |
| 8,702,823 B2 | 4/2014 | Kani et al. |
| 8,715,617 B2 | 5/2014 | Genkin et al. |
| 8,726,628 B2 | 5/2014 | Wichmann et al. |
| 8,747,498 B2 | 6/2014 | Taguchi et al. |
| 8,747,806 B2 | 6/2014 | Catchpole |
| 8,752,390 B2 | 6/2014 | Wright et al. |
| 8,769,961 B2 | 7/2014 | Allam |
| 8,771,637 B2 | 7/2014 | Wynn et al. |
| 8,776,532 B2 | 7/2014 | Allam et al. |
| 8,784,531 B2 | 7/2014 | Okada et al. |
| 8,790,618 B2 | 7/2014 | Adams et al. |
| 8,808,425 B2 | 8/2014 | Genkin et al. |
| 8,852,456 B2 | 10/2014 | Valentin et al. |
| 8,869,889 B2 | 10/2014 | Palmer et al. |
| 8,900,355 B2 | 12/2014 | White |
| 8,900,546 B2 | 12/2014 | Van De Graaf et al. |
| 8,916,304 B2 | 12/2014 | Tamura et al. |
| 8,926,866 B2 | 1/2015 | Kim et al. |
| 8,956,587 B1 | 2/2015 | Peng et al. |
| 8,959,887 B2 | 2/2015 | Allam et al. |
| 8,986,002 B2 | 3/2015 | Palmer et al. |
| 8,986,631 B2 | 3/2015 | Berggren et al. |
| 8,992,642 B2 | 3/2015 | Vik |
| 8,992,669 B2 | 3/2015 | Ideda et al. |
| 9,028,794 B2 | 5/2015 | Darde et al. |
| 9,040,011 B2 | 5/2015 | Filippi et al. |
| 9,061,911 B2 | 6/2015 | Azad |
| 9,062,608 B2 | 6/2015 | Allam et al. |
| 9,068,743 B2 | 6/2015 | Palmer et al. |
| 9,073,007 B2 | 7/2015 | Park et al. |
| 9,101,899 B2 | 8/2015 | Singh et al. |
| 9,126,172 B2 | 9/2015 | Singh et al. |
| 9,132,402 B2 | 9/2015 | Singh et al. |
| 9,216,903 B2 | 12/2015 | McKenna et al. |
| 9,227,844 B2 | 1/2016 | Han et al. |
| 9,240,604 B2 | 1/2016 | Maenishi et al. |
| 9,242,206 B2 | 1/2016 | Okada et al. |
| 9,249,690 B2 | 2/2016 | Karni et al. |
| 9,260,303 B2 | 2/2016 | Filippi et al. |
| 9,309,130 B2 | 4/2016 | Peng et al. |
| 9,321,643 B2 | 4/2016 | Denis et al. |
| 9,321,655 B2 | 4/2016 | Singh et al. |
| 9,327,973 B1 | 5/2016 | Tsai et al. |
| 9,358,506 B2 | 6/2016 | Cheiky |
| 9,359,201 B2 | 6/2016 | Simakov et al. |
| 9,365,131 B2 | 6/2016 | Jamal et al. |
| 9,399,607 B2 | 7/2016 | Tsai et al. |
| 9,415,298 B1 | 8/2016 | Statzer |
| 9,416,728 B2 | 8/2016 | Palmer et al. |
| 9,493,350 B2 | 11/2016 | Morico et al. |
| 9,523,312 B2 | 12/2016 | Allam et al. |

(56) References Cited

U.S. PATENT DOCUMENTS

| | | |
|---|---|---|
| 9,550,671 B2 | 1/2017 | Darde et al. |
| 9,556,026 B1 | 1/2017 | Davis et al. |
| 9,556,027 B2 | 1/2017 | Chakravarti et al. |
| 9,580,314 B2 | 2/2017 | Darde et al. |
| 9,583,776 B2 | 2/2017 | Thornton et al. |
| 9,586,819 B2 | 3/2017 | Xu et al. |
| 9,617,152 B2 | 4/2017 | Johnston |
| 9,637,427 B2 | 5/2017 | Tsai et al. |
| 9,685,672 B2 | 6/2017 | Iiyama et al. |
| 9,745,191 B2 | 8/2017 | Pham et al. |
| 9,776,862 B2 | 10/2017 | Fujisawa et al. |
| 9,776,863 B2 | 10/2017 | Iaquaniello et al. |
| 9,802,820 B2 | 10/2017 | Iaquaniello et al. |
| 9,806,364 B2 | 10/2017 | Jamal et al. |
| 9,869,245 B2 | 1/2018 | Allam et al. |
| 9,914,643 B2 | 3/2018 | Allam |
| 9,917,320 B2 | 3/2018 | Thornton et al. |
| 9,944,522 B2 | 4/2018 | Cheiky |
| 9,969,666 B1 | 5/2018 | Roesch et al. |
| 10,008,730 B2 | 6/2018 | Jamal et al. |
| 10,018,115 B2 | 7/2018 | Allam et al. |
| 10,046,673 B1 | 8/2018 | Allam et al. |
| 10,047,671 B2 | 8/2018 | Allam et al. |
| 10,066,870 B2 | 9/2018 | Klein |
| 10,071,909 B2 | 9/2018 | Beltramini et al. |
| 10,093,542 B2 | 10/2018 | Beltramini et al. |
| 10,131,593 B2 | 11/2018 | Okada et al. |
| 10,155,661 B2 | 12/2018 | Kang et al. |
| 10,160,704 B2 | 12/2018 | Roesch et al. |
| 10,218,020 B2 | 2/2019 | Jamal et al. |
| 10,246,326 B2 | 4/2019 | Chlapik et al. |
| 10,252,910 B2 | 4/2019 | Beltramini et al. |
| 10,252,911 B2 | 4/2019 | Beltramini et al. |
| 10,256,489 B2 | 4/2019 | Kakuwa et al. |
| 10,281,203 B2 | 5/2019 | Guillard et al. |
| 10,283,795 B2 | 5/2019 | Jamal et al. |
| 10,288,346 B2 | 5/2019 | Guillard et al. |
| 10,302,357 B2 | 5/2019 | Hernandez et al. |
| 10,308,508 B2 | 6/2019 | Saloway |
| 10,370,248 B2 | 8/2019 | Kang et al. |
| 10,393,431 B2 | 8/2019 | Roesch et al. |
| 10,415,434 B2 | 9/2019 | Allam et al. |
| 10,422,252 B2 | 9/2019 | Allam et al. |
| 10,464,818 B2 | 11/2019 | Filippi et al. |
| 10,472,236 B2 | 11/2019 | Farace et al. |
| 10,533,494 B2 | 1/2020 | Xiao et al. |
| 10,549,991 B2 | 2/2020 | Wix et al. |
| 10,626,014 B2 | 4/2020 | Nicholson et al. |
| 10,633,313 B1 | 4/2020 | Roesch et al. |
| 10,634,048 B2 | 4/2020 | Forrest et al. |
| 10,634,425 B2 | 4/2020 | Guillard et al. |
| 10,662,127 B2 | 5/2020 | Beauchamp et al. |
| 10,703,629 B2 | 7/2020 | Saloway |
| 10,745,276 B2 | 8/2020 | Warta et al. |
| 10,746,461 B2 | 8/2020 | Allam |
| 10,849,714 B2 | 12/2020 | Lehtonen |
| 10,899,612 B2 | 1/2021 | Seo et al. |
| 10,919,761 B2 | 2/2021 | Lehmann et al. |
| 10,960,372 B2 | 3/2021 | Verykios et al. |
| 10,961,122 B2 | 3/2021 | Verykios et al. |
| 10,975,766 B2 | 4/2021 | Allam et al. |
| 10,988,379 B2 | 4/2021 | Fedorov et al. |
| 10,989,113 B2 | 4/2021 | Forrest et al. |
| 11,059,011 B2 | 7/2021 | Yukumoto et al. |
| 11,066,298 B2 | 7/2021 | Rafati et al. |
| 11,091,704 B2 | 8/2021 | Wegerer et al. |
| 11,130,676 B2 | 9/2021 | Nicholson et al. |
| 11,149,634 B2 | 10/2021 | Callahan |
| 11,149,636 B2 | 10/2021 | Callahan |
| 11,168,045 B2 | 11/2021 | Moreo |
| 11,174,208 B2 | 11/2021 | Beauchamp et al. |
| 11,174,759 B2 | 11/2021 | Allam et al. |
| 11,207,649 B2 | 12/2021 | Hoffman et al. |
| 11,208,323 B2 | 12/2021 | Forrest et al. |
| 11,213,795 B2 | 1/2022 | Hassler et al. |
| 11,231,224 B2 | 1/2022 | Allam et al. |
| 11,253,831 B2 | 2/2022 | Verykios et al. |
| 11,285,437 B2 | 3/2022 | Lu et al. |
| 11,305,250 B2 | 4/2022 | Verykios et al. |
| 11,345,593 B2 | 5/2022 | Mortensen |
| 11,351,517 B2 | 6/2022 | Ulber et al. |
| 11,383,978 B2 | 7/2022 | Verykios et al. |
| 11,434,133 B2 | 9/2022 | Song et al. |
| 11,441,838 B2 | 9/2022 | Vu et al. |
| 11,465,094 B2 | 10/2022 | Rah et al. |
| 11,479,462 B1 | 10/2022 | Spicer |
| 11,485,635 B2 | 11/2022 | Kawamoto et al. |
| 11,485,637 B2 | 11/2022 | Coleman et al. |
| 11,491,437 B2 | 11/2022 | Gary et al. |
| 11,491,456 B2 | 11/2022 | Ko |
| 11,492,254 B2 | 11/2022 | Harale et al. |
| 11,492,255 B2 | 11/2022 | Younes et al. |
| 11,506,122 B2 | 11/2022 | Allam et al. |
| 11,512,257 B1 | 11/2022 | Spicer et al. |
| 11,535,514 B2 | 12/2022 | Mays et al. |
| 11,554,955 B2 | 1/2023 | Tranier |
| 11,583,798 B2 | 2/2023 | Chai et al. |
| 11,583,824 B2 | 2/2023 | Harale et al. |
| 11,597,649 B2 | 3/2023 | Krishnamoorthy et al. |
| 11,607,657 B2 | 3/2023 | Verykios et al. |
| 11,608,266 B2 | 3/2023 | Moore et al. |
| 11,614,280 B2 | 3/2023 | Ko |
| 11,618,676 B2 | 4/2023 | Hill et al. |
| 2002/0004152 A1 | 1/2002 | Clawson et al. |
| 2005/0080146 A1 | 4/2005 | Abbott et al. |
| 2007/0130957 A1 | 6/2007 | Hoffmann et al. |
| 2007/0231244 A1 | 10/2007 | Shah et al. |
| 2010/0263385 A1* | 10/2010 | Allam ............... C01B 3/50 422/187 |
| 2012/0277327 A1 | 11/2012 | Han et al. |
| 2012/0292574 A1 | 11/2012 | Terrien et al. |
| 2012/0301391 A1 | 11/2012 | Basini et al. |
| 2013/0205746 A1 | 8/2013 | Allam et al. |
| 2015/0291438 A1* | 10/2015 | Merritt ............ B01D 53/002 423/352 |
| 2016/0363368 A1 | 12/2016 | Zanganeh et al. |
| 2017/0204335 A1* | 7/2017 | Ravikumar ............ C01B 3/38 |
| 2018/0128172 A1 | 5/2018 | Allam |
| 2018/0363550 A1 | 12/2018 | Allam et al. |
| 2019/0135626 A1 | 5/2019 | Rafati et al. |
| 2019/0337801 A1 | 11/2019 | Ulber et al. |
| 2020/0172395 A1 | 6/2020 | Choi et al. |
| 2020/0307997 A1 | 10/2020 | Trainier |
| 2020/0368667 A1 | 11/2020 | Obata et al. |
| 2020/0406212 A1 | 12/2020 | Mortensen et al. |
| 2021/0139794 A1 | 5/2021 | Mukthiyar et al. |
| 2021/0155478 A1 | 5/2021 | Shrivastava et al. |
| 2021/0179425 A1 | 6/2021 | Ott |
| 2021/0252471 A1 | 8/2021 | Park |
| 2021/0300757 A1 | 9/2021 | Tadiello et al. |
| 2021/0323818 A1 | 10/2021 | Rafati et al. |
| 2021/0395085 A1 | 12/2021 | Paglieri et al. |
| 2022/0040626 A1 | 2/2022 | Coleman et al. |
| 2022/0048768 A1 | 2/2022 | Schmidt et al. |
| 2022/0089437 A1 | 3/2022 | Shrivastava et al. |
| 2022/0099003 A1 | 3/2022 | Lu et al. |
| 2022/0136700 A1 | 5/2022 | Strand et al. |
| 2022/0143549 A1 | 5/2022 | Bauer et al. |
| 2022/0144634 A1 | 5/2022 | Schmidt et al. |
| 2022/0168687 A1 | 6/2022 | Hill |
| 2022/0169500 A1 | 6/2022 | Ko |
| 2022/0169501 A1 | 6/2022 | Matsuo et al. |
| 2022/0185666 A1 | 6/2022 | Streb et al. |
| 2022/0194789 A1 | 6/2022 | Christensen et al. |
| 2022/0203297 A1 | 6/2022 | Lu et al. |
| 2022/0212925 A1 | 7/2022 | Albuali et al. |
| 2022/0212926 A1 | 7/2022 | Wedhaya et al. |
| 2022/0212927 A1 | 7/2022 | Bamagain et al. |
| 2022/0212928 A1 | 7/2022 | Østberg et al. |
| 2022/0212949 A1 | 7/2022 | Fadhel et al. |
| 2022/0219975 A1 | 7/2022 | Feinstein |
| 2022/0219978 A1 | 7/2022 | Tewari et al. |
| 2022/0234018 A1 | 7/2022 | Mackic et al. |
| 2022/0259042 A1 | 8/2022 | Ravikumar et al. |

(56) References Cited

U.S. PATENT DOCUMENTS

| | | |
|---|---|---|
| 2022/0267147 A1 | 8/2022 | Ravikumar et al. |
| 2022/0306463 A1 | 9/2022 | Cruz et al. |
| 2022/0306464 A1 | 9/2022 | Cruz et al. |
| 2022/0306468 A1 | 9/2022 | Cady et al. |
| 2022/0331768 A1 | 10/2022 | Ko |
| 2022/0396480 A1* | 12/2022 | Edlund .................. C10J 3/82 |
| 2023/0002224 A1 | 1/2023 | Younes et al. |
| 2023/0042457 A1 | 2/2023 | Allam et al. |
| 2023/0061332 A1 | 3/2023 | Stroffolino, IV |
| 2023/0089656 A1 | 3/2023 | Galliot et al. |
| 2023/0104475 A1 | 4/2023 | Nam et al. |
| 2023/0105183 A1 | 4/2023 | Nam et al. |
| 2023/0107936 A1 | 4/2023 | You et al. |

FOREIGN PATENT DOCUMENTS

| | | |
|---|---|---|
| WO | WO 2009/105305 | 8/2009 |
| WO | WO 2012/123752 | 9/2012 |
| WO | WO 2021/055185 | 3/2021 |
| WO | WO 2021/055186 | 3/2021 |
| WO | WO 2021/075802 | 4/2021 |
| WO | WO 2021/083776 | 5/2021 |
| WO | WO 2021/117875 | 6/2021 |
| WO | WO 2021/175662 | 9/2021 |
| WO | WO 2021/189137 | 9/2021 |
| WO | WO 2021/223733 | 11/2021 |
| WO | WO 2021/257944 | 12/2021 |
| WO | WO 2022/003313 | 1/2022 |
| WO | WO 2022/034283 | 2/2022 |
| WO | WO 2022/034284 | 2/2022 |
| WO | WO 2022/034285 | 2/2022 |
| WO | WO 2022/038090 | 2/2022 |
| WO | WO 2022/040677 | 2/2022 |
| WO | WO 2022/100899 | 5/2022 |
| WO | WO 2022/106058 | 5/2022 |
| WO | WO 2022/145618 | 7/2022 |
| WO | WO 2022/173263 | 8/2022 |
| WO | WO 2022/180740 | 9/2022 |
| WO | WO 2022/219822 | 10/2022 |
| WO | WO 2022/229838 | 11/2022 |
| WO | WO 2022/241593 | 11/2022 |
| WO | WO 2022/253460 | 12/2022 |

* cited by examiner

APPARATUSES AND METHODS FOR HYDROGEN PRODUCTION

CROSS-REFERENCE TO RELATED APPLICATIONS

The present application is a continuation of U.S. patent application Ser. No. 17/990,443, filed Nov. 18, 2022, which claims priority to U.S. Provisional Patent Application No. 63/280,761, filed Nov. 18, 2021, U.S. Provisional Patent Application No. 63/280,774, filed Nov. 18, 2021, U.S. Provisional Patent Application No. 63/280,786, filed Nov. 18, 2021, U.S. Provisional Patent Application No. 63/280,793, filed Nov. 18, 2021, and U.S. Provisional Patent Application No. 63/423,301, filed Nov. 7, 2022, the disclosures of which are incorporated herein by reference in their entireties.

FIELD OF THE DISCLOSURE

The present disclosure provides for production of hydrogen. More particularly, the disclosure provides apparatuses that are configured for use in hydrogen production and methods for producing hydrogen that can incorporate the apparatuses. The apparatuses and methods may be utilized for hydrocarbon reforming to produce hydrogen. The apparatuses and methods likewise can incorporate for oxy-fuel combustion in the production of hydrogen.

BACKGROUND

Hydrogen combustion for energy production emits only water and avoids the production of carbon dioxide, which takes place when hydrocarbon fuels are burned for energy production. Hydrogen has been described as the fuel of the future as its widespread use replacing hydrocarbon fuels (and complemented by renewable energy production from wind and solar systems) is the best route to achieving low to zero anthropogenic emission of carbon dioxide and thereby helping to address climate change. Hydrogen can be used as a replacement for hydrocarbon fuels. In particular, hydrogen may replace natural gas in the pipeline distribution network supplying fuel for domestic, commercial, and industrial heating.

Hydrogen has been described as the perfect fuel when used with fuel cells for all types of vehicles, both road and rail. Battery powered cars must be fueled from carbon free sources of power (i.e., electricity) available on demand in very large amounts in order for electric vehicles to be effective in reducing global carbon dioxide emissions. To this end, hydrogen can replace natural gas in both existing and new gas turbine combined cycle power generation plants. Hydrogen diluted with nitrogen and/or steam has been demonstrated as a fuel on existing gas turbines by major manufacturers. It is thus expected that implementation of hydrogen for power production will be a key to rapidly implementing the elimination of carbon dioxide from electric power generation without massive additional capital expenditure on new electric generation systems or costly carbon dioxide capture retrofits on existing systems, which result in significant degradation in generation efficiency. The key to the implementation of the hydrogen energy economy is to devise a generic process that has very high thermal efficiency, which is defined as the ratio of the lower heating value (LHV) of the hydrogen product divided by the LHV of the hydrocarbon feed used for hydrogen generation. This must be coupled with a low capital cost simultaneous, near 100% capture of the carbon dioxide produced in the hydrogen generation process for sequestration. The process must also be suitable for the construction of very large production capacity units with low technical risk.

Hydrogen can be produced by electrolysis of water in pressurized electrolysis plants, but power consumption is very high, and the electricity source must be carbon free to secure an environmental advantage. The additional oxygen that is formed as a by-product of electrolysis must also be usefully employed. The likely use for electrolysis will be confined to dealing with excess power production from renewable sources. Hydrogen production from natural gas and light hydrocarbon liquid fuels utilizes reactions between steam or oxygen or a combination of these two processes. For simplicity of explanation, methane ($CH_4$) will be used as the specimen hydrocarbon in this document, although other hydrocarbons may be interchanged as appropriate. The most widely used process is steam natural gas catalytic reforming. The reactions taking place are shown below in Equations 1 and 2.

$$CH_4 + H_2O = CO + 3H_2 \qquad \text{Eq. 1}$$

$$CO + H_2O = CO_2 + H_2 \text{ (i.e., "shift" reactions)} \qquad \text{Eq. 2}$$

The catalytic steam methane reforming (SMR) reaction is highly endothermic with a heat of reaction of 49.201 Kcal/gm mol. The heat is supplied by burning methane plus waste fuel gas in a radiant furnace operating at near atmospheric pressure, which heats an array of thick-walled tubes filled with catalyst and which operate at pressures of around 30 bar to 35 bar. Maximum allowable operating pressure is about 35 bar. Typically, the reaction is carried out in an excess of steam, with the molar ratio of steam to natural gas being in the range of about 3 to about 4. The temperature of the mixture of methane and steam enters the catalytic reactor at a temperature of about 400° C. to about 600° C., and the reactor discharge temperature is generally in the range of about 800° C. to about 900° C. The reaction product of carbon monoxide and hydrogen (i.e., "synthesis gas" or "syngas") is then cooled and passed through one or more shift reactors where the carbon monoxide reacts with water in the presence of a catalyst per Equation 2 to generate more hydrogen and shift the carbon monoxide to carbon dioxide.

To provide the necessary heat for the endothermic reaction, thick walled tubes are generally arranged in spaced apart rows and are heated by radiant heat from flames that are directed downwardly between the spaced apart rows of thick walled tubes from burners mounted in the roof of the catalytic reactor. These flames are generated by the combustion of air and methane (or other hydrocarbon), and the resulting carbon dioxide and water vapor, together with nitrogen from the air, are vented to atmosphere. The combustion gases in the vicinity of the top (inlet) of the catalytic reactor are typically at temperatures of about 1800° C. to about 2500° C., and the combustion gases leave the catalytic reactor at temperatures of about 1000° C. to about 1100° C.

The pressure outside of the thick walled, catalyst filled tubes is typically only slightly below ambient, which explains why the maximum pressure within the tubes does not normally exceed about 35 bar at a typical maximum tube surface temperature of about 1050° C. A maximum pressure ratio of approximately 35:1 is typically considered prudent for reliable operation and long tube life. The thick walled tubes can be centrifugally cast from a high nickel alloy, such as HK40.

An alternative process for production of syngas from hydrocarbon feed is the partial oxidation (PDX) of natural gas using pure oxygen according to the reaction shown below in Equation 3, which can be followed by the shift reactions of Equation 2.

$$CH_4 + 0.5 O_2 = CO + 2H_2 \qquad \text{Eq. 3}$$

The partial oxidation reaction is slightly exothermic at 8.527 Kcal/gm mol, but the reactor must operate at a discharge temperature of about 1300° C. to about 1400° C. for the maximum conversion of the hydrocarbon feed to occur with a reasonable residence time in the reactor. Operating pressure is governed by reactor design and can be as high as about 100 bar.

An auto-thermal reformer (ATR) may also be utilized for production of syngas, and this can comprise a PDX burner operating with excess methane plus added steam with the hot exhaust gas passing through a bed of steam/methane reforming catalyst where further hydrogen generation takes place according to the reaction of Equation 1, and the product syngas (hydrogen plus carbon monoxide) is produced at a temperature of about 1050° C. The high temperature syngas product from these processes is cooled in a steam generator, which produces the steam required for the reactions, but they all generate a very large amount of excess heat, which must be exported in the form of excess steam production or generated electric power.

In order to utilize this excess heat available from the very high temperature of the hydrogen production processes, a two stage process has been devised in which a first stage PDX or ATR is operated in series or in a parallel configuration with a steam/hydrocarbon catalytic reformer—i.e., a gas-heated reformer (GHR). This is heated by the high temperature syngas product from both stages so that the product outlet syngas stream entering the steam generator is reduced in temperature to about 600° C., and the quantity of steam produced is only sufficient for the process requirements for syngas generation. About 25% to 30% extra hydrogen can be generated from a fixed quantity of methane compared to a single stage PDX or ATR.

The production of pure hydrogen from the hot syngas leaving the steam generator involves conversion of carbon monoxide to hydrogen in one or more shift reactors coupled with syngas cooling with the heat evolved being used for boiler feed water and methane preheating. The crude hydrogen stream is processed in a multi-bed pressure swing adsorber (PSA), which produces a substantially pure, pressurized hydrogen product and a low pressure waste gas stream. The carbon dioxide present in the crude hydrogen stream can be removed from either the PSA feed or the PSA waste gas streams by processing in a variety of different ways including carbon dioxide removal using chemical solvents, such as MDEA, or physical solvents, such as Selexol™. A system described in U.S. Pat. No. 8,900,355 separates carbon dioxide by condensation at a temperature close to the carbon dioxide solidification point where the partial pressure of carbon dioxide is minimized. The uncondensed gas can then be recycled to the syn-gas generation system. Each of the methods described can result in the removal of at least 90% and preferably near 100% of the carbon dioxide derived from carbon in the methane feed gas. The most efficient processes currently available for hydrogen generation with near 100% carbon dioxide capture are the PDX plus GHR and the ATR plus GHR where all of the carbon dioxide derived from the total methane feed is present in the pressurized crude hydrogen stream following the shift reactors and coolers.

The steam/methane catalytic hydrogen system (SMR) has the advantage of catalytically oxidizing the methane with water to form the hydrogen product and the carbon dioxide by-product so that no added oxygen is required. The disadvantage of the current SMR system is that carbon dioxide must be removed by a combination of removal from the shifted syngas using chemical and/or physical methods, and the PSA gas can then be used as fuel. Alternatively, a large quantity of methane and all of the PSA waste gas containing the entire carbon dioxide product may be used as fuel gas in the reformer furnace to provide the very large heat of reaction plus the preheat for the reaction products, which means that carbon dioxide must be removed from the near atmospheric pressure stack gas at a concentration of about 12%. Removing large volumes of carbon dioxide at near atmospheric pressure is very costly and also reduces overall process efficiency. Since the furnace acts as a radiant heat transfer system, the exit combustion gases are at temperatures typically in the range of about 1000° C. to about 1100° C., which requires a large heat recovery heat exchange unit that preheats methane plus water feed to the catalyst and generates a large quantity of medium pressure by-product steam.

SUMMARY OF THE DISCLOSURE

The present disclosure relates to hydrogen production methods, individual pieces of equipment or apparatuses that are useful for hydrogen production, and combinations of pieces of the equipment or apparatuses that together can define systems, units, or plants configured for hydrogen production. The hydrogen production of the present disclosure can be carried out so that produced hydrogen can be isolated with increased purity of product and increased process efficiency through appropriate combinations of system components and system operational procedures. The hydrogen production can further exhibit increased efficiency through use of oxy-fuel heating that not only provides process heat but also provides an integrated feature for processing waste gases back through the process to utilize potential heat of combustion remaining in the waste gas. Oxy fuel heating produces substantially only carbon dioxide and steam combustion products, which allows for the separation of pressurized carbon dioxide for sequestration following separation condensed water without the need for a separate carbon dioxide removal system. The hydrogen production can also improve process efficiency by allowing for relatively high operational pressures such that by-product carbon dioxide can be captured at increased pressures that simplify removal thereof and placement for delivery for sequestration or other use of the carbon dioxide. The hydrogen production can additionally exhibit improved process efficiency and reduction materials costs through utilization of specifically chosen component parts of the unit/system/plant. This can include, for example, new and useful gas heated reforming (GHR) reactor designs and/or ion transport membrane (ITM) technologies for direct production of heat of combustion with oxygen separation from air. The disclosure thus provides clean hydrogen technology that increases hydrogen generation efficiency, reduces capital expenditure (CAPEX), reduces design complexity, and maintains near 100% carbon capture.

In one or more embodiments, the present disclosure can provide oxy-fuel heated, hydrogen production systems. These systems can be formed from a variety of combinations of components as described herein. In some embodiments, an example oxy-fuel heated, hydrogen production systems can comprise:

a reforming reactor arranged to receive a stream comprising a hydrocarbon and water through a first inlet and separately receive a stream of a heating fluid through a second inlet, the reactor including a catalyst component effective for catalyzing a reaction between the hydrocarbon and the water to form a synthesis gas stream comprising at least hydrogen and carbon monoxide, and the reactor including a synthesis gas outlet arranged for exit of the synthesis gas stream from the reforming reactor;

an oxy-fuel combustor arranged to receive a fuel, an oxidant, and a stream comprising predominately carbon dioxide and comprising a combustor outlet for exit of a combustion product stream from the oxy-fuel combustor, the oxy-fuel combustor being configured to combust at least a portion of the fuel with oxygen from the oxidant to form carbon dioxide and water, which is combined with the stream comprising predominately carbon dioxide to form the combustion product stream;

a hydrogen isolation unit arranged to receive at least a portion of the synthesis gas stream, and provide at least part of the hydrogen from the synthesis gas stream as a substantially pure hydrogen product stream; and a purification unit arranged to receive at least a portion of the combustion product stream and output a stream of substantially pure carbon dioxide, the purification unit also being arranged to deliver at least a portion of the substantially pure carbon dioxide as the stream comprising predominately carbon dioxide;

wherein the reforming reactor and the oxy-fuel combustor are functionally configured so that at least part of the combustion product stream is provided through the second inlet of the reforming reactor as the stream of the heating fluid.

In further embodiments, an oxy-fuel heated, hydrogen production system can be further defined in relation to any one or more of the following statements. These following statements are intended to be combinable in any number and order, and it is understood that the express listing of these statements provides indication that each of the possible combinations are identifiable in light of the following statements as read in light of the full disclosure provided herein.

The reforming reactor can comprise a pressure containment vessel and at least one set of concentrically arranged tubes positioned within the pressure containment vessel, each of the at least one set of concentrically arranged tubes comprising: an outer catalyst tube; an inner reaction product gas tube; and catalyst material positioned within a space defined between an inside surface of the outer catalyst tube and an outside surface of the inner reaction product gas tube.

The at least one set of concentrically arranged tubes positioned within the pressure containment vessel can be arranged vertically so that an upper end of the at least one set of concentrically arranged tubes defines a hot end where the reforming reactor operates with a higher temperature, and a lower end of the at least one set of concentrically arranged tubes defines a cold end where the reforming reactor operates with a lower temperature, relative to the hot end.

The reforming reactor further can comprise an upper tube sheet that is arranged to functionally align with the outer catalyst tube, and a lower tube sheet that is arranged to functionally align with the inner reaction product gas tube.

The reforming reactor can be arranged so the first inlet opens into a space defined between the upper tube sheet and the lower tube sheet.

The reforming reactor can be arranged so that the stream comprising a hydrocarbon and water entering through the first inlet passes upwardly, from the cold end toward the hot end, through the space within which the catalyst material is positioned.

The reforming reactor can be arranged so that the synthesis gas outlet is positioned at a level of the reforming reactor that is below a position of the first inlet.

The reforming reactor can be arranged so that the synthesis gas outlet is positioned below the lower tube sheet.

A bottom of the lower tube sheet and a bottom portion of the pressure containment vessel can define a collection space for the synthesis gas stream, which proceeds downwardly from the hot end through an inner bore of the inner reaction product gas tube.

The second inlet of the reforming reactor can be configured to receive the heating fluid in an arrangement so that the heating fluid provides heat to the outer catalyst tube.

The arrangement can be such that the heating fluid entering the second inlet of the reforming reactor contacts the hot end of the at least one set of concentrically arranged tubes and flows downwardly around an outer surface of the outer catalyst tube toward a second outlet through which the heating fluid leaves the reforming reactor.

The second outlet can be positioned at a level of the reforming reactor that is above a position of the first inlet.

The reforming reactor further can comprise a surrounding tube positioned around the at least one set of concentrically arranged tubes, the surrounding tube being arranged to form heating space relative to the at least one set of concentrically arranged tubes and define a flow path of the heating fluid through the heating space.

The reforming reactor further can comprise a plurality of baffles attached to an inner surface of the pressure containment vessel and arranged to direct flow of the heating fluid for contact with the at least one set of concentrically arranged tubes.

The upper end of the at least one set of concentrically arranged tubes can define a filling tube with a removable plug.

The removable plug can be configured to provide biased force toward the catalyst within the at least one set of concentrically arranged tubes.

An outer surface of the at least one set of concentrically arranged tubes can comprise a plurality of fins configured to facilitate heat transfer between the heating fluid and the at least one set of concentrically arranged tubes.

At least a portion of internal surfaces of the reforming reactor that are exposed to a partial pressure of carbon monoxide at operating temperatures where a Bouduard reaction occurs can be protected from metal dusting corrosion by the presence of a protective coating or a layer of internal insulation.

The space defined between the inside surface of the outer catalyst tube and the outside surface of the inner reaction product gas tube that is filled with catalyst can define a section having a length about 6 meters to about 18 meters.

The oxy-fuel heated, hydrogen production system further can comprise at least one shift reactor configured to convert at least a portion of the carbon monoxide in the synthesis gas from the reforming reactor to carbon dioxide and output a shift stream comprising at least hydrogen, carbon dioxide, and waste gas.

The hydrogen isolation unit can comprise an inlet arranged to receive the shift stream, output a pressurized stream of substantially pure hydrogen, and output a stream comprising at least part of the waste gas.

The hydrogen isolation unit can comprise a hydrogen multi-bed pressure swing adsorber (PSA) configured to output the pressurized stream of substantially pure hydrogen and output the stream comprising at least part of the waste gas.

The PSA can be configured with a hydrogen recycle line arranged to send part of the pressurized stream of substantially pure hydrogen back to the inlet of the PSA.

The hydrogen isolation unit further can comprise at least one compressor arranged to receive and compress at least a portion of the stream comprising at least part of the waste gas and output a compressed waste gas stream.

The hydrogen isolation unit further can comprise a membrane gas separator having an inlet arranged to receive the compressed waste gas stream, and wherein the membrane gas separator is configured to separate the compressed waste gas stream into a pressurized retentate waste gas stream and a hydrogen-enriched permeate stream.

The membrane gas separator can comprise an inlet arranged to receive a stream of substantially pure carbon dioxide for passage through a permeate side of a membrane in the membrane gas separator counter-current to the compressed waste gas stream.

The hydrogen isolation unit further can comprise a recirculation line through which the hydrogen-enriched permeate stream is passed back to the inlet of the PSA.

The oxy-fuel heated, hydrogen production system further can comprise a line through which at least part of the pressurized retentate waste gas stream is passed to the oxy-fuel combustor.

The oxy-fuel heated, hydrogen production system further can comprise a gas turbine.

The oxy-fuel heated, hydrogen production system further can comprise a line through which at least a portion of the pressurized stream of substantially pure hydrogen is passed to the gas turbine.

The oxy-fuel heated, hydrogen production system further can comprise an ammonia synthesis unit.

The oxy-fuel heated, hydrogen production system further can comprise a line through which at least a portion of the pressurized stream of substantially pure hydrogen is passed to the ammonia synthesis unit.

The oxy-fuel heated, hydrogen production system further can comprise a power producing turbine arranged to receive at least a portion of the synthesis gas stream and expand said stream for power production.

The oxy-fuel combustor can comprise an outer combustor shell and a combustor liner that defines internally a combustion chamber.

The oxy-fuel combustor can be arranged to receive at least part of the stream comprising predominately carbon dioxide through the combustor liner.

The oxy-fuel combustor can be arranged to receive a first part of the stream comprising predominately carbon dioxide into a reaction zone of the combustion chamber and to receive a second part of the stream comprising predominately carbon dioxide into a dilution zone of the combustion chamber.

The oxy-fuel combustor can comprise an ion transport membrane (ITM) combustor.

The ITM combustor can comprise an oxygen ion transport diffusion membrane separating an air side of the ITM combustor from a fuel side of the ITM combustor.

The oxygen ion transport diffusion membrane can be effective to draw oxygen from air passing through the air side of the ITM combustor into the fuel side of the ITM combustor for combustion of fuel passed through the fuel side of the ITM combustor.

The oxy-fuel heated, hydrogen production system can comprise a plurality of ITM combustors.

The oxy-fuel heated, hydrogen production system further can comprise a heat exchanger arranged to receive at least a portion of the heating fluid after the heating fluid exits the reforming reactor and configured to transfer heat from the heating fluid to one or more further streams.

The one or more further streams to which the heat is transferred from the heating fluid can include one or more of the fuel that is received by the oxy-fuel combustor, the oxidant that is received by the oxy-fuel combustor, the stream comprising predominately carbon dioxide that is received by the oxy-fuel combustor, and the stream comprising the hydrocarbon and water that is received by the reforming reactor.

The oxy-fuel heated, hydrogen production system further can comprise a purification unit arranged to receive the heat fluid after leaving the heat exchanger and configured to output the stream comprising predominately carbon dioxide.

The oxy-fuel heated, hydrogen production system further can comprise a compressor arranged to receive the stream comprising predominately carbon dioxide leaving the purification unit and configured to compress the stream comprising predominately carbon dioxide to a pressure suitable for input to the oxy-fuel combustor.

These and other features, aspects, and advantages of the disclosure will be apparent from a reading of the following detailed description together with the accompanying drawings, which are briefly described below. The disclosure includes any combination of elements, components, and features that are described herein, regardless of whether such elements, components, and features are expressly combined in a specific embodiment description herein. This disclosure is intended to be read holistically such that any separable features, components, or elements of the disclosure, in any of its various aspects and embodiments, should be viewed as intended to be combinable unless the context clearly dictates otherwise.

BRIEF DESCRIPTION OF THE FIGURES

Having thus described the disclosure in the foregoing general terms, reference will now be made to the accompanying drawings, which is not necessarily drawn to scale, and which should be viewed as illustrating example embodiments of the presently disclosed subject matter.

Figure 1:
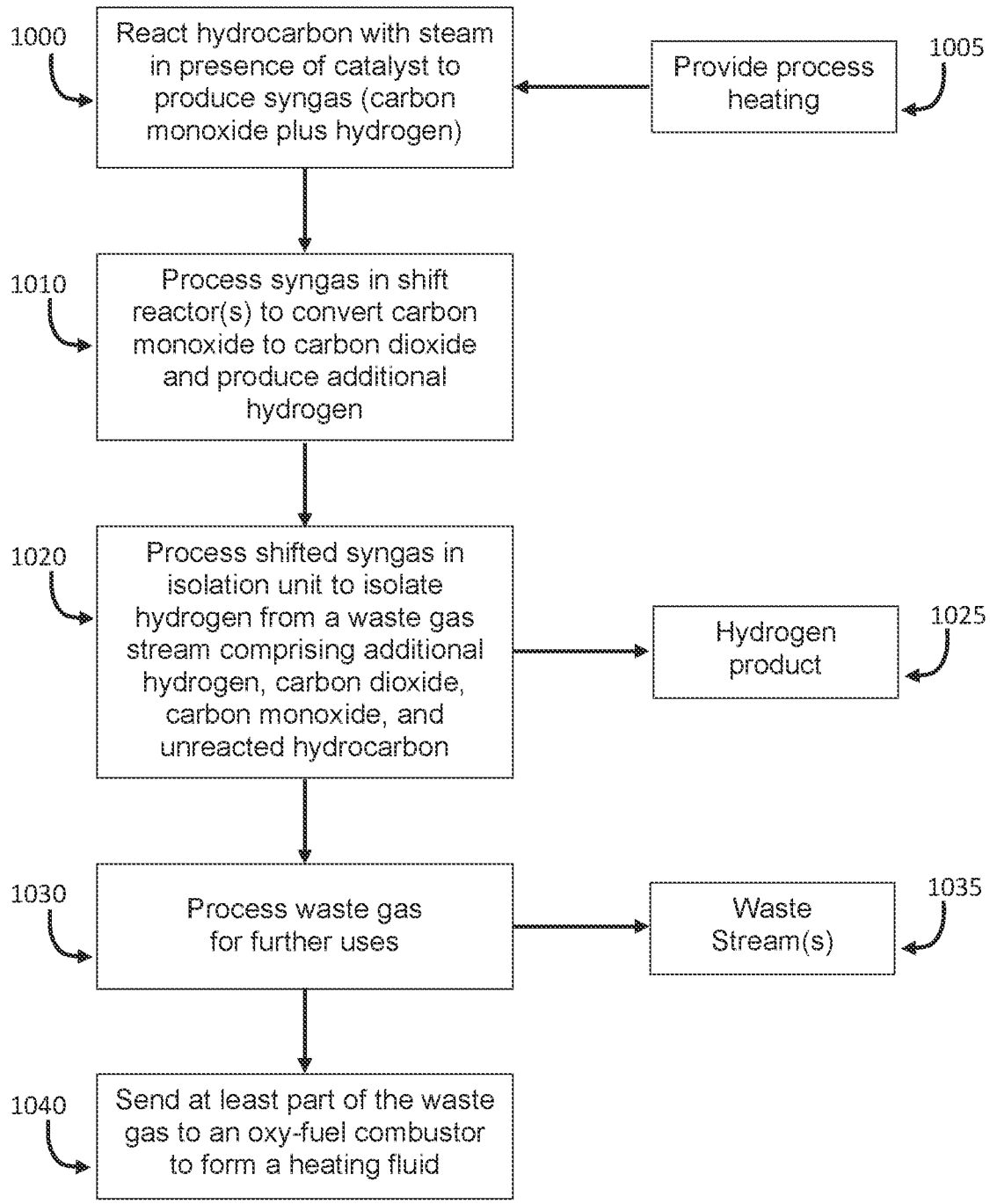

FIG. 1 is a flowchart illustrating steps in an oxy-fuel hydrogen production process according to example embodiments of the present disclosure.

Figures 2A, 2B:
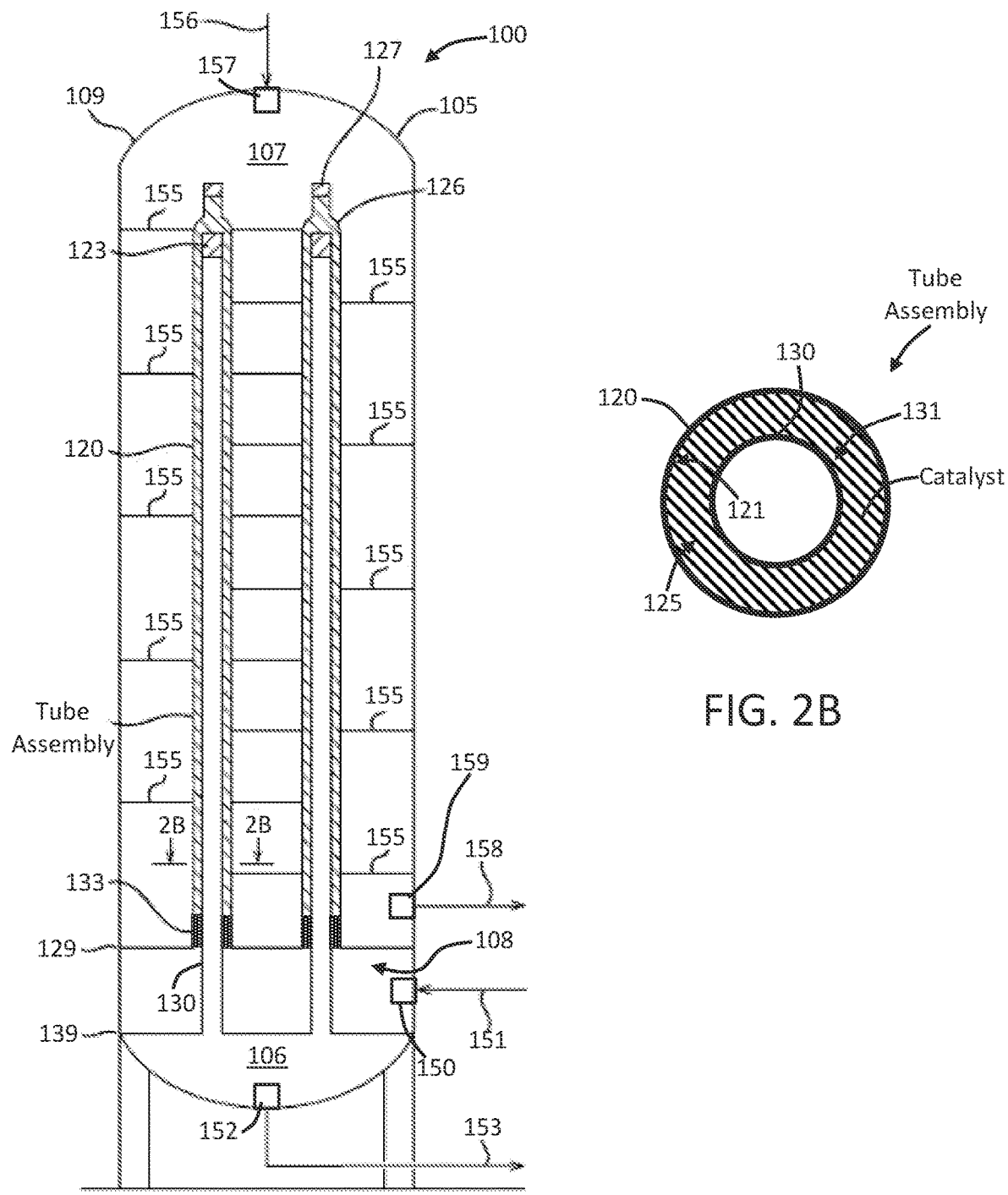

FIG. 2A is a partial cross-sectional illustration of an example design for a gas heated reforming reactor according to embodiments of the present disclosure.

FIG. 2B is a transecting view of the partial cross-sectional illustration of FIG. 2A showing the arrangement of the tubes in the gas heated reforming (GHR) reactor.

Figures 3A, 3B:
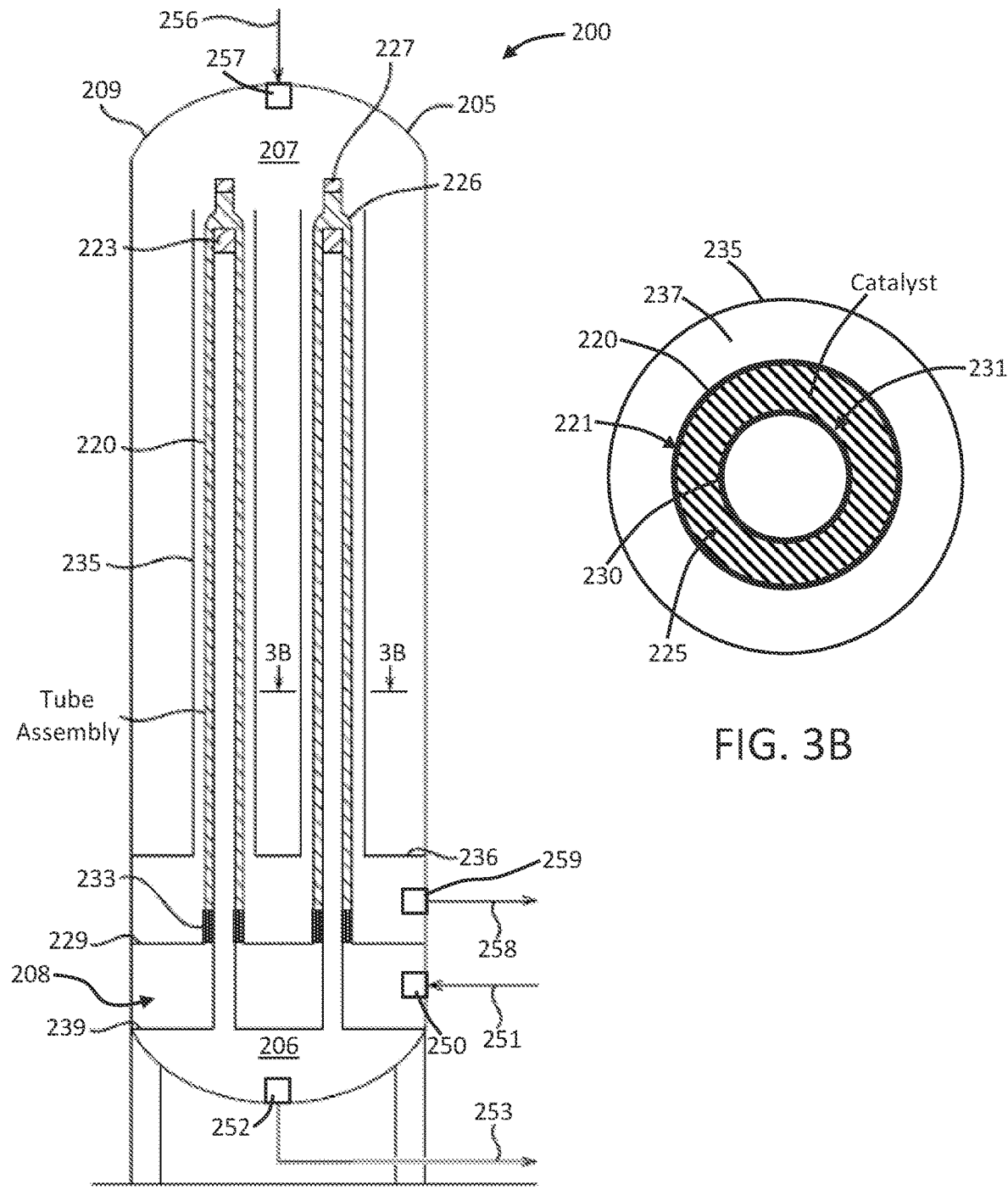

FIG. 3A is a partial cross-sectional illustration of another example design for a gas heated reforming reactor (GHR) according to embodiments of the present disclosure.

FIG. 3B is a transecting view of the partial cross-sectional illustration of FIG. 3A showing the arrangement of the tubes in the gas heated reforming reactor.

Figure 4:
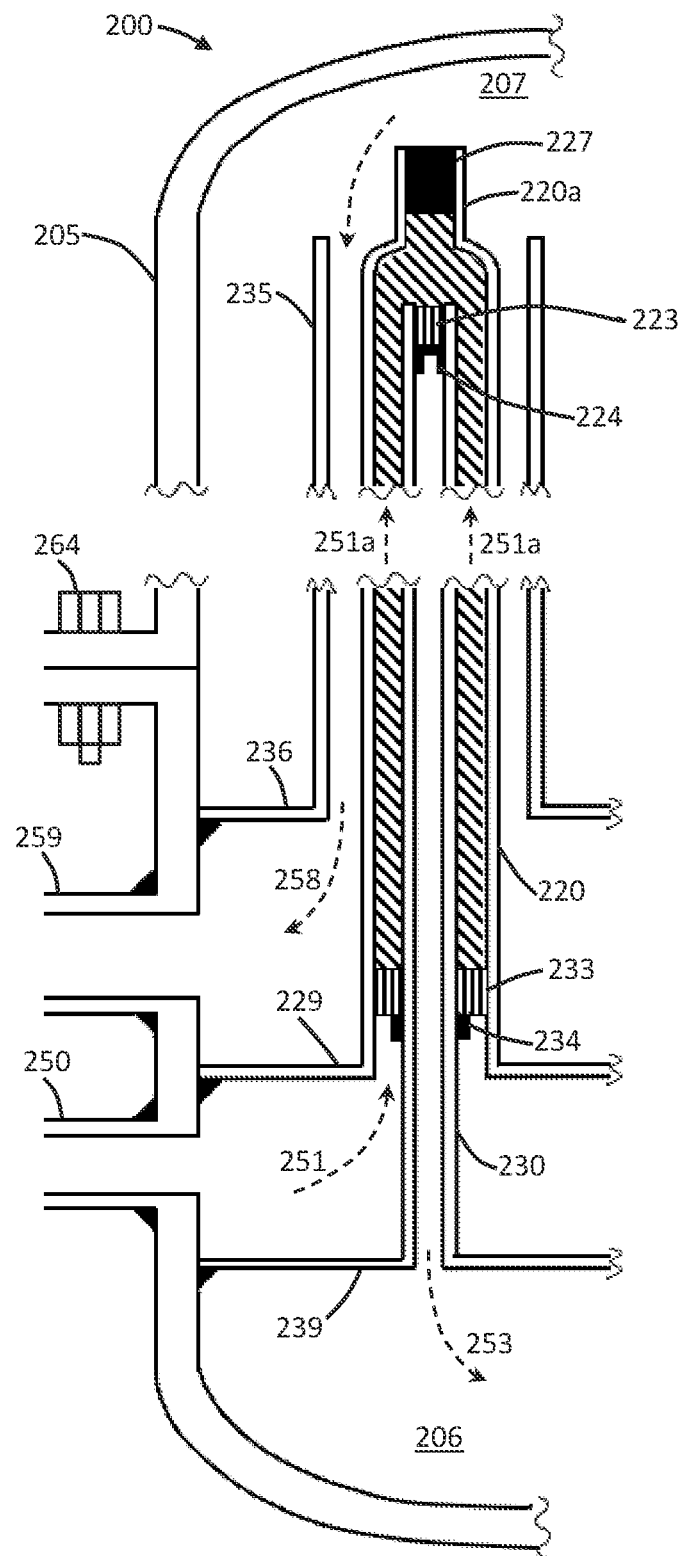

FIG. 4 is a partial cross-sectional illustration providing a more detailed arrangement of a single reactor tube within a gas heated reforming reactor according to embodiments of the present disclosure.

Figure 5:
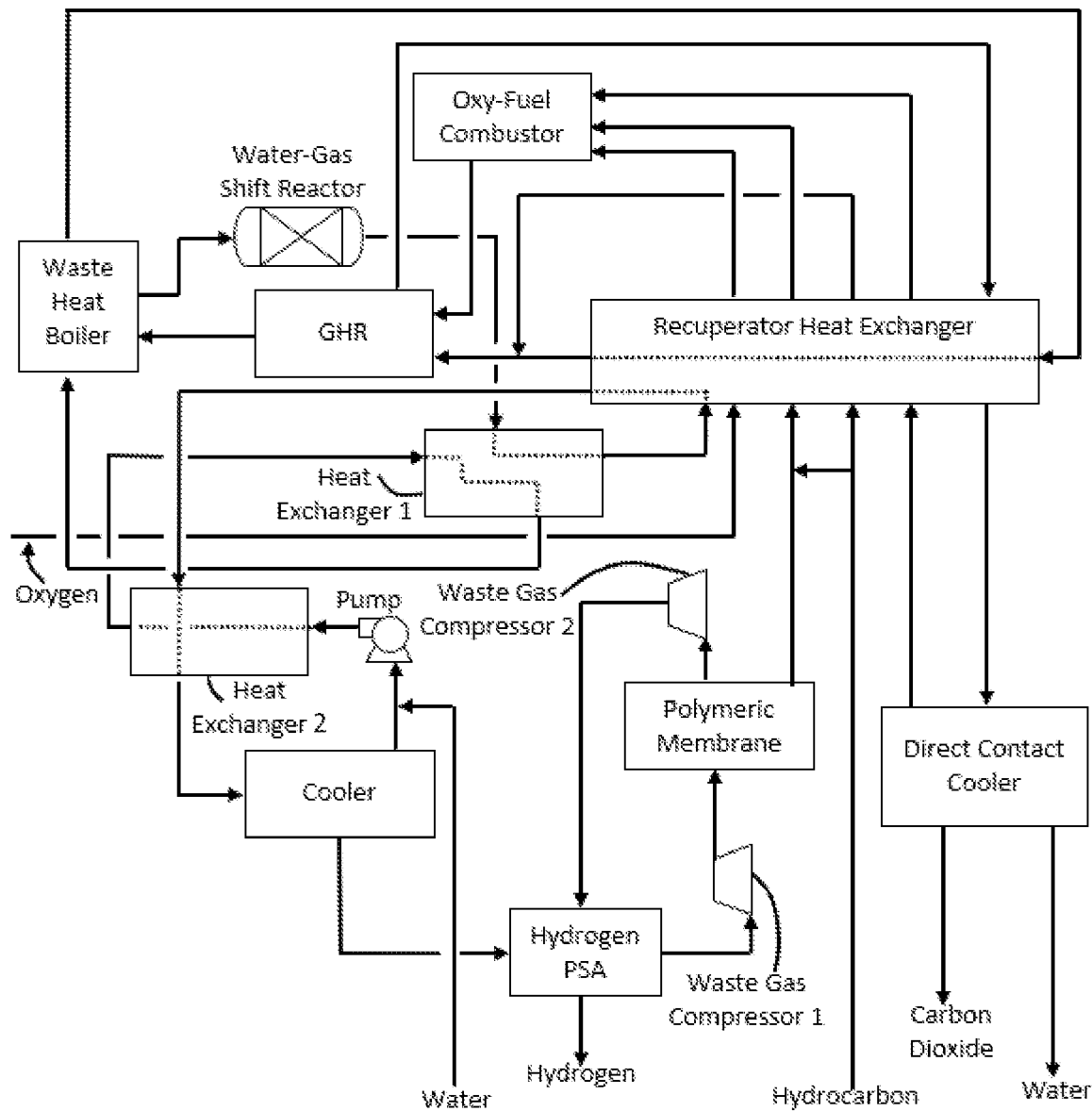

FIG. 5 is a flow diagram illustrating at least a portion of the components useful in an oxyfuel hydrogen production process according to example embodiments of the present disclosure.

Figure 6:
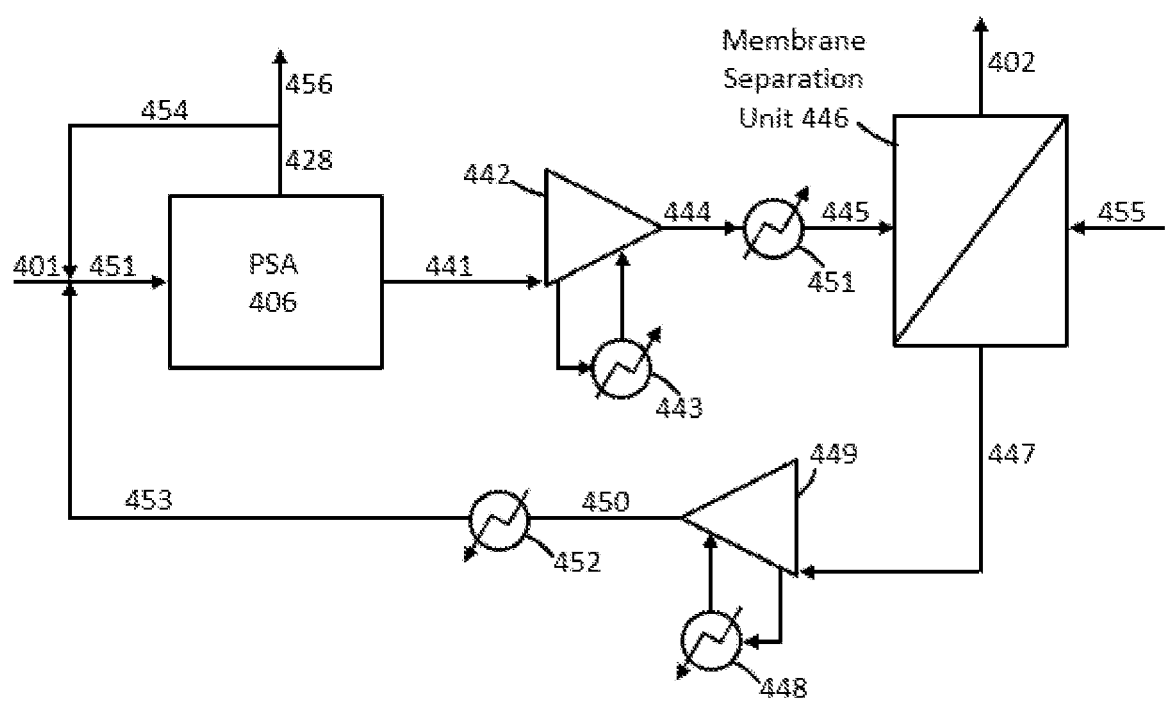

FIG. 6 is a flow diagram illustrating at least a portion of the components useful in a hydrogen isolation unit, which can be particularly useful in oxy-fuel hydrogen production processes according to example embodiments of the present disclosure.

Figure 7:
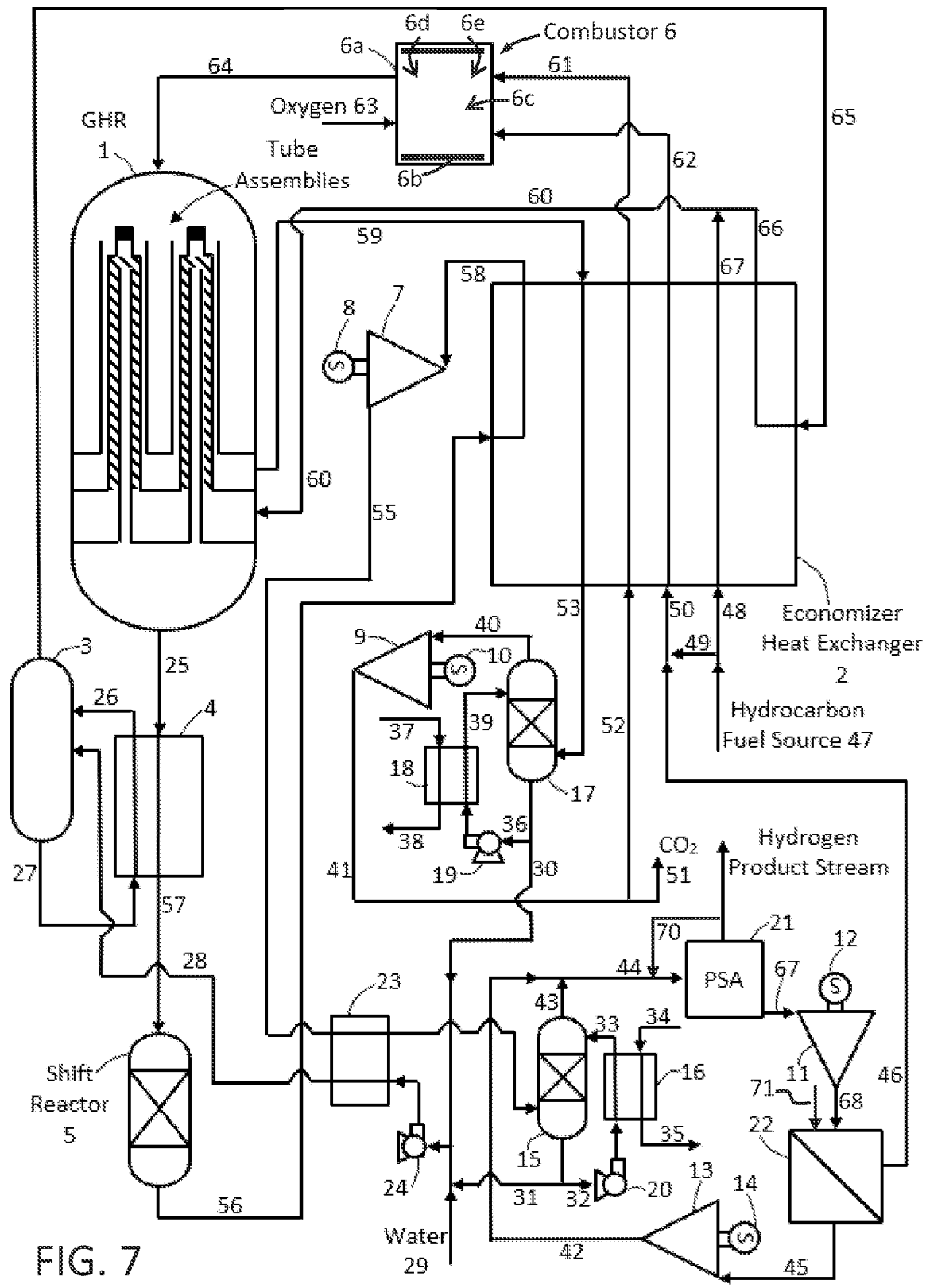

FIG. 7 is flow diagram illustrating an oxy-fuel hydrogen production system according to example embodiments of the present disclosure useful for carrying out oxy-fuel hydrogen production processes according to example embodiments of the present disclosure.

Figure 8:
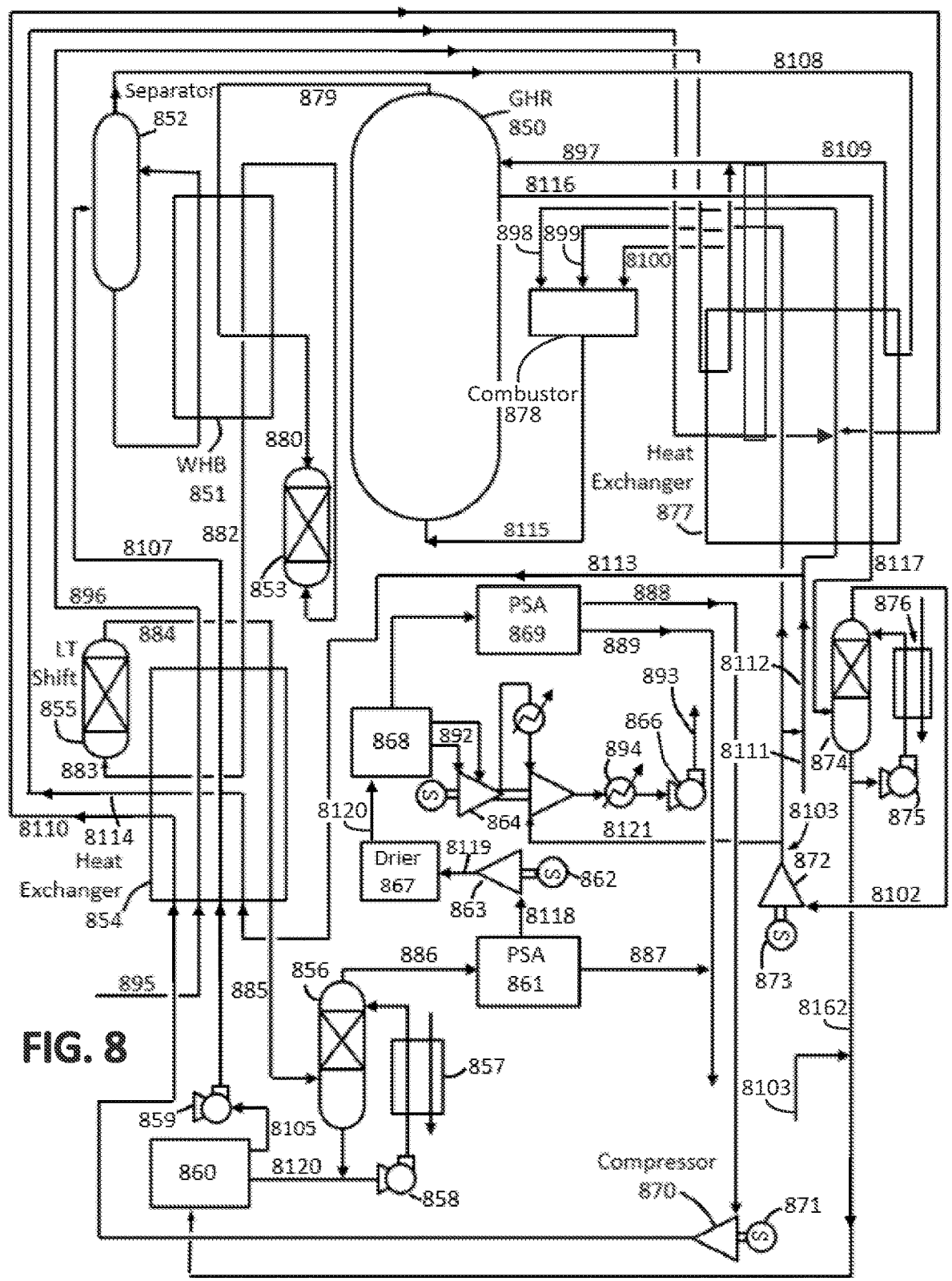

FIG. 8 is a flow diagram illustrating an oxy-fuel hydrogen production system according to example embodiments of the present disclosure useful for carrying out oxy-fuel hydrogen production processes according to example embodiments of the present disclosure.

Figure 9:
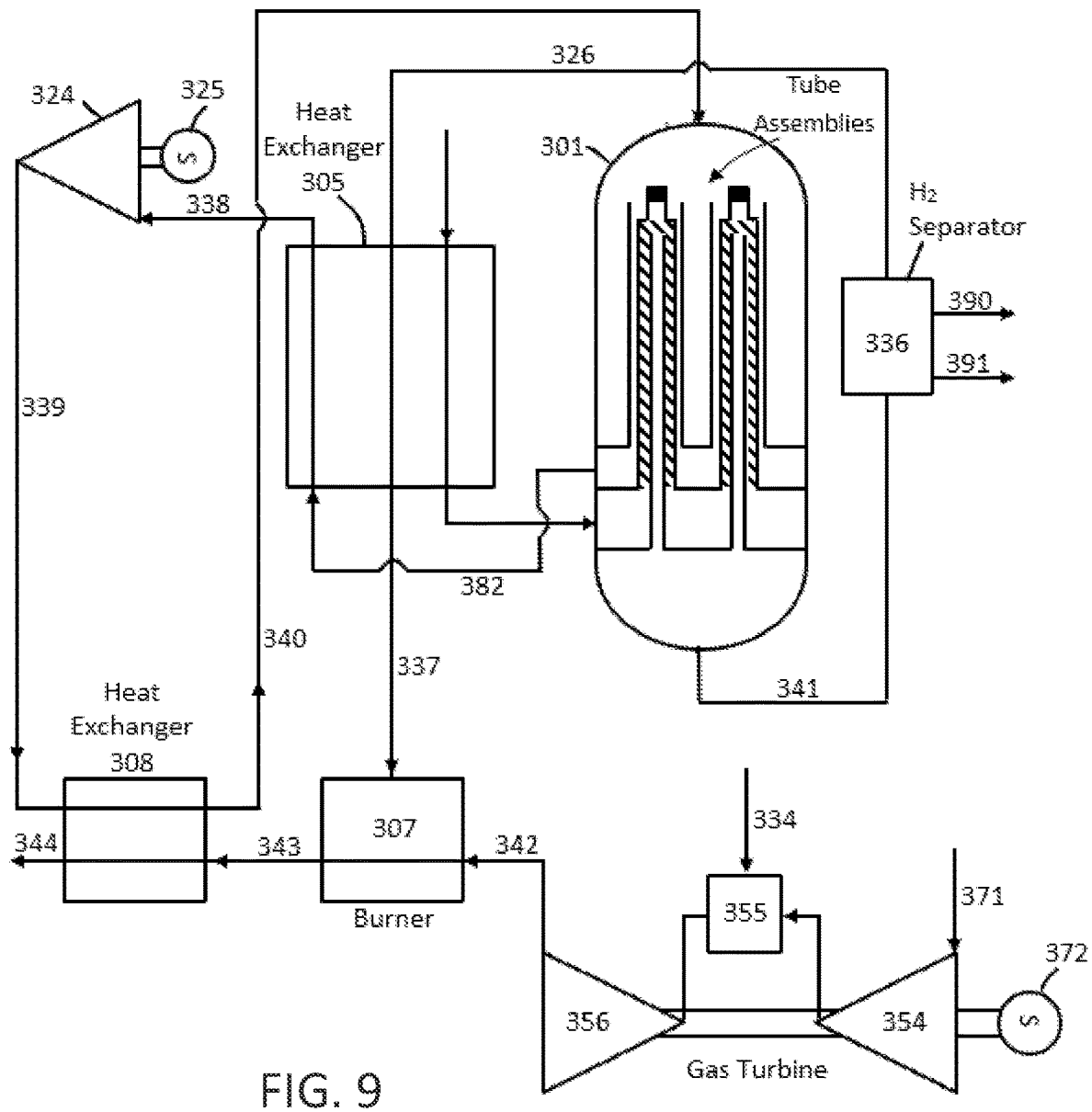

FIG. 9 is a flow diagram illustrating an oxy-fuel hydrogen production system according to example embodiments of the present disclosure useful for carrying out oxy-fuel hydrogen production processes according to example embodiments of the present disclosure including the use of a gas turbine exhaust as an oxidant to combust waste gas as fuel to provide heat for a circulating stream of predominately carbon dioxide for use as a heating fluid in a reforming reactor.

Figure 10:
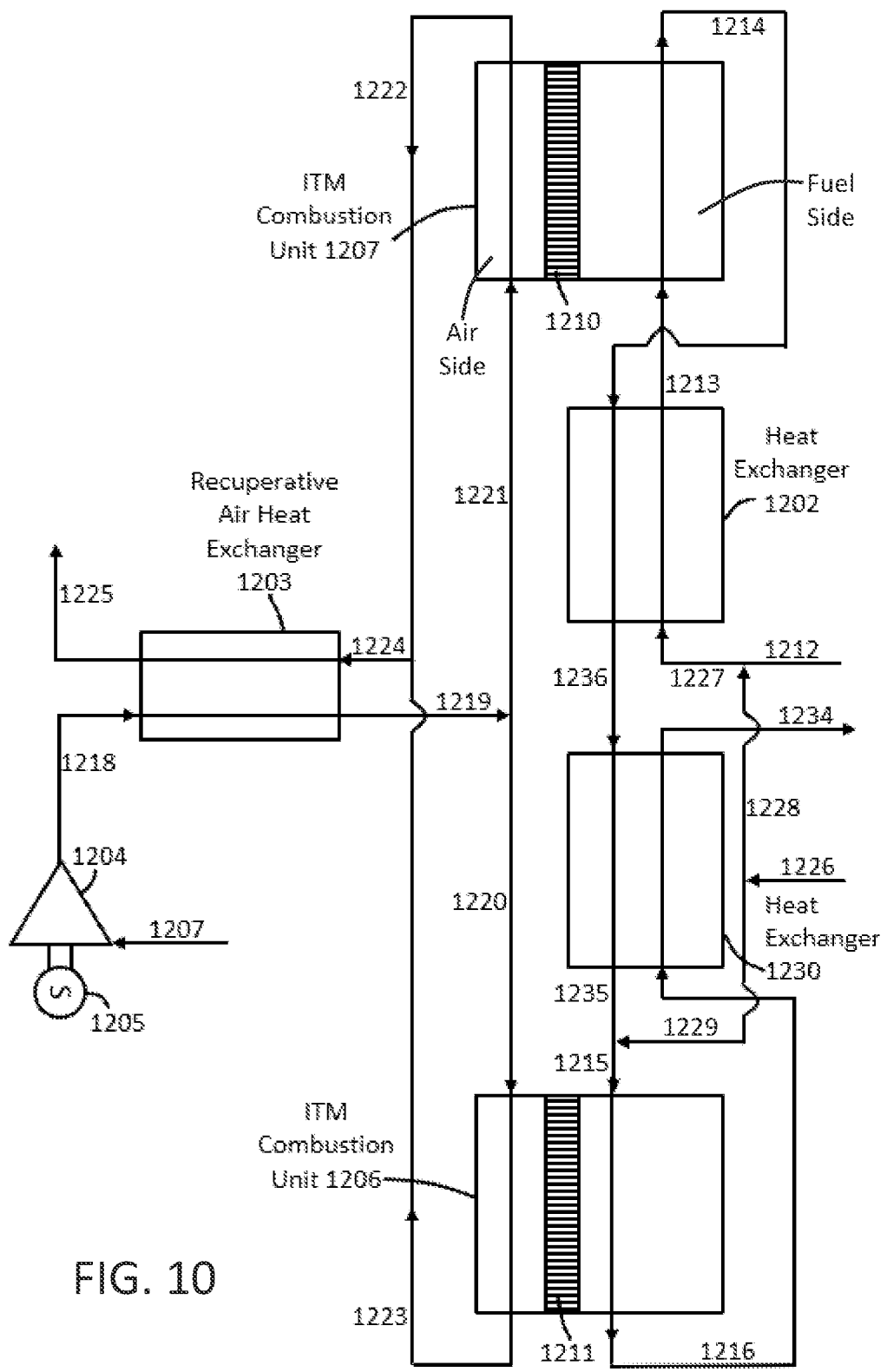

FIG. 10 is a flow diagram illustrating an ion transport membrane (ITM) combustor arrangement useful in oxy-fuel hydrogen production systems according to example embodiments of the present disclosure useful for carrying out oxy-fuel hydrogen production processes according to example embodiments of the present disclosure.

DETAILED DESCRIPTION OF THE DISCLOSURE

The present subject matter will now be described more fully hereinafter with reference to exemplary embodiments thereof. These exemplary embodiments are described so that this disclosure will be thorough and complete, and will fully convey the scope of the subject matter to those skilled in the art. Indeed, the subject matter can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure provides for improved manners of hydrogen production and processes, systems, and equipment that can individually, or in combination, exhibit the improvements in the production of hydrogen. Several embodiments are provided herein, and the several embodiments are described individually only for ease of disclosure and ease of understanding. The several embodiments, however, are expressly intended to be useful individually or in any combination of the several embodiments. It is understood that each embodiment provides improvements in hydrogen production arising from the specific features of the individual embodiment. The individual embodiments arise from recognition of shortcomings in the existing methods and equipment used for hydrogen production, and each individual embodiment thus provides a useful improvement and advantage in hydrogen production. The improvements and advantages can be multiplied through combinations of the individual embodiments, and the unique features of each embodiment are evidence that the improvements achieved with the combinations of the embodiments are not an expected, cumulative effect but are rather synergistic effects arising from the various combinations of the individual embodiments.

In some embodiments, the present disclosure provides for oxy-fuel hydrogen production systems and methods that can use a carbon dioxide removal system upstream of a hydrogen PSA apparatus or unit, such as with a carbon dioxide condensation system, which can be expedient since there is no need to remove all of the carbon dioxide in the stream entering the PSA. In some embodiments, the present disclosure provides for oxy-fuel hydrogen production systems and methods that include a hydrogen isolation unit comprising a hydrogen PSA plus a membrane system, which enables use of a single PSA while still recovering significant proportions of the hydrogen present in the gas stream being treated, even greater than 98% hydrogen recovery in certain embodiments. In some embodiments, the present disclosure provides for oxy-fuel hydrogen production systems and methods that can use an Ion Transport Membrane (ITM) oxygen supply system in place of a cryogenic Air Separation Unit (ASU), and this can enable efficient combustion of hydrocarbon fuel (and PSA waste gas, in certain embodiments) within the ITM unit to produce a heating fluid stream for a GHR without the requirement for a separate combustor. In some embodiments, the present disclosure provides for oxy-fuel hydrogen production systems and methods that can incorporate a new gas heated reforming (GHR) reactor specifically configured to make use of an oxy-fuel combustion product stream as a heating fluid.

A general flow diagram of a process for hydrogen production from a hydrocarbon source stream is illustrated in FIG. 1. As seen therein, the hydrocarbon of choice is reacted at step 1000 with steam in the presence of a catalyst to produce syngas. It is understood that use of the term "syngas" herein is referencing synthesis gas, which is predominately carbon monoxide (CO) and hydrogen ($H_2$) but which also may contain small amounts of additional components. Since a focus of the present disclosure to hydrogen production, the disclosure addressed mainly the hydrogen product that is originally present in the synthesis gas but also the carbon monoxide since it can be converted to additional hydrogen and also carbon dioxide in the shift reactions also described herein. Reference to hydrogen and carbon monoxide when discussing the synthesis gas, or syngas, is thus not meant to exclude other components that may be present in the syngas in typically small amounts, unless the context of the discussion clearly intends to only address the hydrogen and/or the carbon monoxide portions of the syngas.

Process heat can be provided at step 1005 and may be provided from a variety of sources. Syngas produced in step 1000 is processed at step 1010 in one or more shift reactors to convert carbon monoxide to carbon dioxide ($CO_2$) and produce additional hydrogen as well. The shifted syngas stream is then processed at step 1020 in a pressure swing absorber in order to isolate hydrogen, which is taken for further uses at step 1025. A waste gas stream is likewise produced and can comprise, for example additional hydrogen, CO, carbon dioxide, and unreacted hydrocarbon. This waste gas is processed at step 1030 for additional uses. This can include separation of at least a portion of the waste gas into individual components for capture, and the individual components may be removed as individual waste streams at step 1035. In some embodiments, at least a portion of the waste gas can be sent in step 1040 to an oxy-fuel combustion component to be combusted with hydrocarbon fuel. The combustion products then can form at least a part of the process heating noted in step 1005 above.

Hydrogen production according to the present disclosure can proceed via this general process, which process is modified by any single embodiment of the present disclosure or by any combination of two embodiments, three embodiments, or more embodiments of the preset disclosure. In an example embodiment, a hydrogen production can be carried out using a single stage pressurized catalytic steam plus methane syngas generation reactor including a supply of the required heat and can utilize a simple, low cost hydrogen separation system that is effective to achieve high purity hydrogen isolation with up to 100% carbon dioxide capture from waste gas streams, which waste gas streams can be provided at a high pressure typically required for hydrogen production.

The present disclosure particularly can utilize a gas heated reformer (GHR) that is configured to operate under conditions not previously attainable and thereby provide for greatly improved efficiency of hydrogen production, reduced capital costs for hydrogen production, reduced operational costs for hydrogen production, and simplified operational procedures for hydrogen production. The GHR arrangements described herein by various example embodiments can be utilized in various hydrogen production processes, and the modification of such processes to utilize one or more of the present GHR arrangements can, by itself, provide the desired outcomes otherwise described herein for hydrogen production. It is understood, however, that the present disclosure also encompasses further embodiments wherein the implementation of one or more of the GHR arrangements described herein can be combined with one or more of the additional process improvements and/or apparatuses described herein.

The disclosure particularly provides a heating unit that achieves very high efficiency of methane conversion to hydrogen in the form of a gas heated reforming reactor (GHR) that provides for production of hydrogen at significantly higher pressures than previously used in the art due to its design features and its ability to control conversion of methane (and/or other hydrocarbon fuels) to syngas. The GHR can utilize a higher conversion pressure and can efficiently recycle fuel gas containing unconverted hydrocarbon back to an associated heating component, preferably an oxy-fuel burner.

The first optional arrangement of a GHR 100 is provided in FIG. 2A. The GHR 100 comprises an outer vessel 105, which can be a pressure vessel. The outer vessel 105 extends from a first end 106, which is a lower or bottom end, to a second end 107, which is an upper or top end. Within the outer vessel 105 is one or more tube assemblies, and the outer vessel preferably includes a plurality of the tube assemblies. A single tube assembly is described following, but it is understood that the description can apply to any one, two, or more of the tube assemblies that are present within the outer vessel 105.

An individual tube assembly within the GHR 100 comprises an assembly outer tube 120 and an assembly inner tube 130. The assembly outer tube 120 may be referenced herein as an outer catalyst tube since, as discussed below, a catalyst material can be retained within the assembly outer tube 120 along with the concentrically arranged assembly inner tube 130. An assembly inner tube 130 may be referenced herein as an inner reaction product gas tube since the syngas formed by the catalytic reaction of hydrocarbon and steam while passing through the catalyst will be produced downwardly through the assembly inner tube 130. As illustrated, the tubes are configured to have a cross-sectional shape that is substantially round; however, other cross-sectional shapes are also encompassed by the present disclosure, such as elliptical, rectangular, square, and the like. The assembly outer tube 120 and assembly inner tube 130 are concentrically arranged such that a space 125 exists between the tubes (see FIG. 2B).

The assembly inner tube 130 is configured as a central syngas product outlet tube. The vessel 105 is arranged to receive heating gas at the upper end 107, and the upper portion of the GHR can thus be characterized as the hot end of the GHR 100 while the lower end 106 can be characterized as the cold end of the GHR 100, and the tube assemblies within the GHR 100 can likewise be characterized as having hot ends and cold ends in relation to the location thereof relative to the hot end of the GHR 100 and the cold end of the GHR 100. The terms "hot" and "cold" are thus used to define relative temperature conditions between the opposing upper end 107 and lower end 106. The hot end of the assembly outer tube 120 can comprise a removable cap 127 or hot end cover. The term "cap" is not intended to limit the structure of the element, and the element need only be configured to removably engage the hot end of the assembly outer tube 120 to close off the hot end thereof. The cap 127 may engage the outer surface of the assembly outer tube 120 or the inner surface of the assembly outer tube 120 to provide the closing function. To this end, the hot end of the assembly outer tube 120 can be configured as a filling head 126, and this can be a shape or other arrangement that allows for ease of addition of catalyst to the space 125 between the assembly outer tube 120 and the assembly inner tube 130. The cap 127 also can be functional to cause syngas that is formed as reaction materials pass upwardly between the assembly inner tube 130 and the assembly outer tube 120 to turn and move downwardly through the interior of the assembly inner tube 130. An upper portion of the assembly inner tube 130 can include a top plug 123 that is configured to substantially prevent passage of any catalyst material therethrough while allowing passage of gas. The top plug 123 can thus be made of a porous material, such as stainless steel or nickel alloy, with an average pore size of less than 1 mm, less than 0.5 mm, or less than 0.2 mm, such as about 0.01 mm to about 0.95 mm, about 0.02 mm to about 0.75 mm, or about 0.05 mm to about 0.5 mm.

The space 125 between the assembly outer tube 120 and the assembly inner tube 130 is at least partially filled with a catalyst for reforming the steam plus hydrocarbon that is processed into the GHR 100. The catalyst preferably is granular, particulate, or otherwise in a suitable shape and size to provide the necessary surface area for catalyzing the reforming reactions. In some embodiments, the space 125 can be defined as an annular space. More particularly, the space 125 is defined by an inside surface 121 of the assembly outer tube 120 and an outside surface 131 of the assembly inner tube 130. The space 125 between the assembly outer tube 120 and the assembly inner tube 130 can define one or more sections that are filled with the catalyst. In some embodiments, the catalyst filled section can extend up substantially to the filling head 126 or to the cap 127. A bottom of the catalyst filled section can be defined by a bottom plug 133 that is configured to substantially prevent passage of any catalyst material therethrough while allowing passage of gas. The bottom plug 133 can thus be made of a porous material, such as stainless steel or nickel alloy, with an average pore size of less than 1 mm, less than 0.5 mm, or less than 0.2 mm, such as about 0.01 mm to about 0.95 mm, about 0.02 mm to about 0.75 mm, or about 0.05 mm to about 0.5 mm. The length of the catalyst filled section can be about 5 meters to about 24 meters, about 7 meters to about 20 meters, or about 10 meters to about 18 meters.

The assembly inner tube 130 can have an outer diameter in the range of about 15 mm to about 40 mm, about 18 mm to about 35 mm, or about 20 mm to about 30 mm. In an example embodiment, assembly inner tube 130 can have an outer diameter of 25.4 mm. The assembly outer tube 120 can have an inner diameter of about 45 mm to about 120 mm, about 50 mm to about 110 mm, or about 60 mm to about 100 mm. In an example embodiment, the assembly outer tube 121 can have an inner diameter of 76 mm. The assembly outer tube 120 and the assembly inner tube 130 each can independently be made from corrosion resistant materials, such as stainless steel or high nickel alloy, and can have a wall thickness of, for example, about 0.5 mm to about 5 mm, about 0.8 mm to about 4 mm, or about 1 mm to about 3 mm.

The tube assemblies are supported by tube plates, which are arranged as substantially flat sheets with holes positioned and sized to appropriately meet ends of the individual tubes in the tube assemblies. As illustrated in FIG. 2A, an upper tube sheet 129 is arranged to functionally align with the assembly outer tube 120, and a lower tube sheet 139 is arranged to functionally align with the assembly inner tube 130. The upper tube sheet 129 may be characterized as a feed gas inlet tube sheet, and the lower tube sheet 139 may be characterized as a syngas outlet tube sheet. Preferably, the functional alignment includes welded connections between the tube sheets and the tube or other arrangements to provide substantially sealed sections defined in part by the tube sheets and in part by the outer vessel 105. For example, a feed gas inlet distribution space 108 can be defined between a bottom surface of the upper tube sheet 129 and a top surface of the lower tube sheet 139. As a further example, the lower end 106 of the GHR can define an outlet collection space between a bottom surface of the lower tube sheet 139 and the inner surface of the bottom of the vessel 105.

The vessel 105 further includes an inlet 150 configured to receive a reaction feed stream 151 comprising steam plus hydrocarbon. A syngas product stream 153 leaves the GHR 100 through an outlet 152. The vessel 105 also includes an inlet 157 arranged to receive a heating fluid stream 156. A series of baffles 155 can be arranged on an interior surface of the wall defining the vessel 105, and these can be functional to provide a baffled multi-pass shell side flow path for the heating fluid through the vessel 105. The heating fluid flows downwardly in the vessel 105 and exits through an outlet 159 as return heat fluid stream 158.

In order to minimize the design temperature of the vessel 105 defining the GHR arrangement 100, and to allow low cost alloys to be used for construction, internal insulation can be used. The inner surface of the assembly inner tube 130, the inner surface of the assembly outer tube 120, and the surfaces of the upper tube sheet 129 and lower tube sheet 139 will be exposed to high partial pressures of carbon monoxide at temperatures where the Bouduard reaction will take place with the potential to cause metal dusting corrosion. To address such reactions, corrosion resistant alloys, such as Specialty Metals alloy 693, may be used, and/or exposed components may be coated with a plasma sprayed impervious oxide layer, such as alumina, and/or exposed surfaces may be covered with impervious internal insulation.

The assembly outer tube 120 can have finned outer surfaces to promote heat transfer. In embodiments with heating fluid passing across the tubes, radial fins may be preferred while, in other embodiments, longitudinal fins may be preferred. The GHR 100 is preferentially arranged vertically (i.e., with a vertically aligned longitudinal axis) so that the hot ends are the ends including the filling heads 126 and caps 127. This arrangement provides the ability to inject the heating fluid 156 to flow downward through the vessel 105 to heat the tube assemblies while also providing the filling heads 126 and the caps 127 at the top of the GHR to facilitate the filling and emptying of catalyst in the assembly outer tubes 120. Addition and/or removal of catalyst may be carried out by removal of a removable top section 109 of the vessel 105. This top section 109 may be lifted off for servicing of the GHR 100 and replacement of catalyst in the tube assemblies, and the top section 109 can be replaced for operation of the GHR 100.

A second optional arrangement of a GHR 200 according to an example embodiment of the present disclosure is illustrated in FIG. 3A. The GHR 200 has the same overall layout as the first GHR arrangement but also has the addition of a third surrounding tube. With reference to FIG. 3A, the GHR 200 again comprises an outer vessel 205, which can be a pressure vessel. The outer vessel 205 extends from a first end 206, which is a lower or bottom end, to a second end 207, which is an upper or top end. Within the outer vessel 205 is one or more tube assemblies, and the outer vessel 205 preferably includes a plurality of the tube assemblies. A single tube assembly is described following, but it is understood that the description can apply to any one, two, or more of the tube assemblies that are present within the outer vessel 205. Moreover, it is understood that description above of the materials, arrangements, and configurations of the first arrangement of a GHR 100 can equally apply to the second arrangement of a GHR 200 that is further discussed below.

An individual tube assembly within the GHR 200 comprises an assembly outer tube 220 and an assembly inner tube 230. As illustrated, the tubes are configured to have a cross-sectional shape that is substantially round; however, other cross-sectional shapes are also encompassed by the present disclosure, such as elliptical, rectangular, square, and the like. The assembly outer tube 220 and assembly inner tube 230 are concentrically arranged such that a space 225 exists between the tubes (see FIG. 3B).

The assembly inner tube 230 is configured as a central syngas product outlet tube. The vessel 105 is arranged to receive heating gas at the hot, upper end 207 of the GHR. The hot end of the assembly outer tube 220 defines a filling head 226 and can comprise a removable cap 227 or hot end cover having the same configurations as already described above. The space 225 between the outer assembly tube 220 and the inner assembly tube 230 is again at least partially filled with a catalyst for reforming the steam plus hydrocarbon that is processed into the GHR 100. In GHR 200, the space 125 again is defined by an inside surface 221 of the assembly outer tube 220 and an outside surface 231 of the assembly inner tube 230. The space 225 between the assembly outer tube 220 and the assembly inner tube 230 can define one or more sections that are filled with the catalyst, as already described above. An upper portion of the assembly inner tube 130 can include a top plug 223 that is configured to substantially prevent passage of any catalyst material therethrough while allowing passage of gas. A bottom of the catalyst filled section can be defined by a bottom plug 233 that is configured to substantially prevent passage of any catalyst material therethrough while allowing passage of gas. The top plug 223 and the bottom plug 233 can thus be made of a porous material, such as stainless steel or nickel alloy, with an average pore size of less than 1 mm, less than 0.5 mm, or less than 0.2 mm, such as about 0.01 mm to about 0.95 mm, about 0.02 mm to about 0.75 mm, or about 0.05 mm to about 0.5 mm. The assembly inner tube 230 and assemble outer tube 220 can again have dimensions as already described. The tube assemblies are supported by tube plates, and an upper tube sheet 229 is arranged to functionally align with the assembly outer tube 220, and a lower tube sheet 239 is arranged to functionally align with the assembly inner tube 230. The upper tube sheet 229 may be characterized as a feed gas inlet tube sheet, and the lower tube sheet 239 may be characterized as a syngas outlet tube sheet. Preferably, the functional alignment includes welded connections between the tube sheets and the tube or other arrangements to provide substantially sealed sections defined in part by the tube sheets and in part by the vessel. For example, a feed gas inlet distribution space 208 can be defined between a bottom surface of the upper tube sheet 229 and a top surface of the lower tube sheet 239. As a further example, the lower end 206 of the GHR can define an outlet collection space between a bottom surface of the lower tube sheet 239 and the inner surface of the bottom of the vessel 205.

The vessel 205 further includes an inlet 250 configured to receive a reaction feed stream 251 comprising steam plus hydrocarbon. A syngas product stream 253 leaves the GHR 200 through an outlet 252. The vessel 205 also includes an inlet 257 arranged to receive a heating fluid stream 256. The heating fluid flows downwardly in the vessel 205 and exits through an outlet 259 as return heat fluid stream 258. The vessel 205 again also will include construction, insulation, and/or coatings as already described above to minimize the design temperature prevent corrosion or other fouling of parts arising from, for example, the Bouduard reaction. The assembly outer tube 220 can have finned outer surfaces to promote heat transfer. In such embodiments, longitudinal fins are preferred while, in other embodiments, radial fins may be preferred. The GHR 200 is preferentially arranged vertically (i.e., with a vertically aligned longitudinal axis) with the hot ends at the top to facilitate the filling and emptying of catalyst in the assembly outer tubes 220. Addition and/or removal of catalyst may be carried out by removal of a removable top section 209 of the vessel 205. This top section 209 may be lifted off for servicing of the GHR 200 and replacement of catalyst and replaced for operation of the GHR 200.

In the embodiment of FIG. 3A, the tube assemblies further include a third surrounding tube 235 that surrounds the outer catalyst tube 220. The surrounding tube 235 is sealed to the wall of the vessel 235 wall by a third tube sheet 236, and the surrounding tube 235 can be arranged relative to the third tube sheet 236 for engagement, such as by welding. The heating fluid 256, which can comprise, for example carbon dioxide, will flow through a space 237 defined between the outer assembly tube 220 and the third surrounding tube 235 and enter an outlet cooling gas collection space 238 defined by the third tube sheet 236 and the upper tube sheet 229 before leaving as return heat fluid stream 258. The third surrounding tube 235 is open ended at the hot upper end and forms a flow path for the circulating heating fluid transferring heat to the catalyst filled space 225 between assembly outer tube 220 and the assembly inner tube 220. The third surrounding tube 235 can have an inner diameter of about 60 mm to about 180 mm, about 70 mm to about 160 mm, or about 80 mm to about 140 mm. In an example embodiment, the third surrounding tube 235 can have an inner diameter of about 102 mm.

A more detailed illustration of the arrangement of the tube assemblies is provided in FIG. 4. The GHR 200 is illustrated relative to the example embodiment that includes the third surrounding tube 235, but it is understood that the description otherwise also applies to the GHR 100 that does not include the third surrounding tube. With reference to FIG. 4, the reaction feed stream 251, which preferably is preheated and includes hydrocarbon and steam, enters through an inlet 250 positioned between the upper tube sheet 229 and the lower tube sheet 239 and passes into the space 225 between the assembly inner tube 230 and the assembly outer tube 222, which is filled with catalyst. The inlet flow of feed gas passes through a porous plug 233 that is positioned in the space 225 near the base of the assembly outer tube 220, and the porous plug 233 rests on a locating collar 234. The top portion of the assembly outer tube 220 is capped so that syngas 251a, which forms as the reaction feed stream passes upwardly through the catalyst-filled space 225, and which can include some amount of unreacted hydrocarbon and steam, must then flow downwards through the assembly inner tube 230. The top of the assembly inner tube 230 is sealed by a porous plug 223 resting on a locating collar 224. The upper tube sheet 229 holds the assembly outer tubes 220, while the assembly inner tubes 230 are held by the lower tube sheet 239. The tube sheets 229 and 239 define the feed gas inlet distribution space 208. The lower end 206 of the GHR 200 defines an outlet collection space for the syngas product stream 253.

Located on the top of the sealed end of the assembly outer tube 220 is a short extension tube 220a, which is used for filling and emptying catalyst particles. The catalyst is filled up to a point within the extension tube 220a well above the closed end of assembly outer tube 220. The extension tube 220a is then closed by a plug 227, which can be biased, such as with a spring or similar mechanism, to exert a downward force on the catalyst particles during operation of the GHR 200. This arrangement prevents bed fluidization and bed movement when in operation with reacting gas passing upwards through the catalyst bed. The top section 207 of the pressure vessel 205 defining GHR arrangement 200 can be removed using the flanged closure 264 to expose the tops of all of the assembly outer tubes 220 and their extension tubes 220 to facilitate catalyst filling and replacement. The tube sheets 236, 229, and 239 may be welded into the shell of the pressure vessel 205 forming the GHR arrangement 200 (or GHR 100, to which the present disclosure also fully applies).

As seen from the foregoing, there are a number of ways in which the shell side flow can be passed over the tube assemblies, and particularly over the outer surface of the assembly outer tubes 120, 220. One method is to use a baffled shell multi-pass cross-flow design, as described above in relation to GHR arrangement 100. Another option is to sheath each of the tubes in an outer tube so that each tube has a pure counter-current heat transfer relationship between the reacting gases in the catalyst bed and the heating means provided by both the cooling syngas product delivered through the internal space of the assembly inner tube 130, 230 and the cooling stream of carbon dioxide and water that is used as a heating gas around the assembly outer tube 120, 220. The outer surface of the assembly outer tubes 130, 230 can have radial fins in the case of the cross-flow arrangement and longitudinal fins for the sheathed tube arrangement. The final selection will depend on capital costs and pressure loss, which will increase the power requirement of the carbon dioxide circulation compressor. An important consideration in the design is to allow each individual tube to be filled with catalyst and for this catalyst to be easily removed and replaced at regular intervals. The double tube sheet arrangement makes catalyst charge and discharge at the cooler end very difficult. A preferred arrangement is for the reactor to be mounted vertically, with the flow upwards through the catalyst section in the space between the assembly outer tubes 120, 220 and the assembly inner tubes 130, 230 and to fill each section from the top through a fill tube extension at the closed end of the catalyst filled tubes. They can all be easily exposed by lifting off the top part of the reactor containment vessel. This arrangement with the high temperature at the top of the vessel is preferred because it improves heat transfer from the heating fluid to the tube assemblies while also providing the tube assemblies in an arrangement that simplifies servicing thereof, particularly in relation to removing and replacing spent catalyst material.

The oxy-fuel GHR of the present disclosure is particularly beneficial in that it can use a high pressure heating fluid stream that is fully oxidized and that can also have as much as 5%, 4%, 3%, 2%, or 1% oxygen on a molar basis, such as about 0.1% to about 5%, about 0.5% to about 4%, or about 1% to about 2% oxygen content on a molar basis. The previous applications of GHR reactors coupled with either a PDX or ATR syngas generation unit were operated with a reducing fluid therein, which resulted in the shell side GHR heating gas having a high concentration of CO, which produces carbon formation below about 850° C. in the Bouduard reaction (i.e., $CO+CO=CO_2+C$) and potentially severe metal dusting of the reformer tubes. The tubes must be protected by using corrosion resistant high nickel alloy with some aluminum and chromium, such as Specialty Metals alloy 693. In addition, the tubes can be coated with a plasma sprayed layer of alumina. All these costly factors can be avoided with the presently disclosed GHR configurations, particularly when combined with an oxy-fuel heating system, which is more fully described below. A further advantage of the presently disclosed arrangements is that the pressure of the heating fluid stream (e.g., comprising at least carbon dioxide and water) can be at a pressure that is within about 10 bar, within about 7 bar, within about 5 bar, or within about 3 bar of the inlet pressure of the reactant feed stream comprising hydrocarbon and steam, which enters the catalyst filled tube assemblies. In other words, the pressure differential between the heating fluid stream and the reactant stream comprising the hydrocarbon and water/steam is less than 15 bar, less than 10 bar, or less than 5 bar. The ability to operate under such a small pressure differential across the tube walls minimizes stress in the walls of the assembly outer tubes 120, 220, in particular, and this enables the ability to utilize tubes with significantly smaller thicknesses relative to other reforming reactors. The reduction in tube wall thickness according to the present disclosure can be such that the tube walls are reduced in thickness relative to known reforming reactors by at least 10%, at least 15%, at least 20%, at least 25%, at least 30%, at least 40%, or at least 50%, such as a reduction in thickness of about 10% to about 75%, about 15% to about 60%, or about 20% to about 50%.

The GHR arrangements described herein can be specifically configured for use in the catalytic reforming of hydrocarbons, and particularly methane, by catalytic reaction between the hydrocarbon and steam in the presence of the catalyst. The heat of reaction and the heat required to preheat the reaction products can be provided in a variety of manners, and it is understood that the GHR arrangements are not necessarily limited to use in combination with the further embodiments of the disclosure. Nevertheless, the disclosed GHR arrangements are particularly beneficial for use in the further described methods and systems/units/plants for producing hydrogen. In some embodiments, therefore, the heat of reaction can be provided by indirect heat transfer from the circulation of a stream that comprises predominantly carbon dioxide and that also comprises steam. The carbon dioxide plus steam stream (i.e., heating fluid stream 156, 256) can be heated by the combustion of a hydrocarbon in oxygen. The operation of the heating fluid stream circulating through the GHR 100, 200 at a pressure near to the pressure of the reforming reaction itself ensures that at all points in the GHR arrangements 100, 200, the pressure difference between the heating fluid stream 156, 256 and the reaction feed stream 151, 251, which comprises hydrocarbon plus steam, is minimized. This enables configuration of the GHR arrangements 100, 200 for operation as a high temperature reactor system with minimal pressure differentials (as just discussed above), and this in turn provides the ability to use tubes and tube sheets of relatively small thicknesses (as also just described above), which results in an economical reactor design.

The steam plus hydrocarbon catalytic reforming reactions that produce a product gas mixture comprising carbon monoxide, hydrogen, and carbon dioxide, together with unconverted hydrocarbon and steam, are designed to provide a reaction product temperature in the range of about 600° C. to about 1000° C., about 700° C. to about 1000° C., or about 850° C. to about 950° C., and the reaction occurs in a space that contains a granular catalyst and that must be externally heated to achieve the noted reaction product temperature and also since there is a very large endothermic heat of reaction. To maximize process efficiency, it is desirable to use the sensible heat in the reaction product gas leaving the catalyst bed and to cool this gas down to a temperature approach of about 25° C. to about 100° C. relative to the preheated steam plus hydrocarbon feed to the reforming reactor (GHR 100, 200). The most convenient way that this can be accomplished is to use a concentric tube arrangement for the GHR 100, 200 in which the catalyst is in the space between the assembly outer tubes 120, 220 and the assembly inner tubes 130, 230, and the reaction product stream 153, 253 comprising hydrogen plus carbon monoxide passes back along the central bore of the assembly inner tube 130, 230. As described above, the assembly outer tubes 120, 220 are capped at the hot end. The assembly outer tubes 120, 220 and assembly inner tubes 130, 230 are located on two separate tube sheets, which separately define an inlet distribution space for the preheated reaction feed stream 151, 251 and an outlet collection space for the syngas reaction product stream 153, 253. Both of these tube sheets are at the cooler end of the vessel 105, 205 defining the GHR 100, 200. There is no requirement for a hot end tube sheet with the concentric tube design. The individual tubes are free to expand and contract as the reactor heats up and cools down with no restraint and no effect on any other components. The two tube sheets have minimal pressure differences across them, and this minimizes the required tube sheet thickness as noted above relative to known systems. The tube sheets also are able to be sealed into the pressure vessel 105, 205 by welding, and this eliminates the need for expensive, very large diameter flanges to hold the tube sheets within the vessel, as is required in known systems.

Multiple numbers of concentric tubes are used in the reactor depending on the heat transfer medium, which will enter the shell side of the reactor containment vessel at a temperature that is about 10° C. to about 200° C., about 20° C. to about 150° C., or about 25° C. to 100° C. higher than the temperature of the syngas reaction product 153, 253 leaving the GHR 100, 200. The pressure difference between the heating fluid stream 156, 256 and the syngas reaction product stream 153, 253 leaving the GHR 100, 200 can be, in certain embodiments, in the range of about 1 bar to about 5 bar, about 1 bar to about 4 bar, or about 1 bar to about 3 bar.

The hydrogen production methods of the present disclosure beneficially can incorporate the GHR arrangements 100, 200 in combination with additional operational configurations that provide for high purity hydrogen production in a highly efficient and cost-effective manner. In some embodiments, an oxy-fuel combustor can be used to produce the heating fluid stream 156, 256, and the fuel gas used in the oxy-fuel burner can be one or both of a waste gas from the hydrogen PSA system and a hydrocarbon, such as methane. The heating fluid stream 156, 256 can be at a pressure that is preferably less than 5 bar difference from the syngas reaction product stream 153, 253 leaving the GHR 100, 200 and has a temperature that is about 25° C. to about 100° C. greater than the formed syngas entering the central bore of the assembly inner tube 130, 230. The conditions for the reforming reaction that takes place in the GHR 100, 200 are such that a steam to active carbon ratio of about 3 to about 9, about 4 to about 7, or about 5 to about 7 is used. As an example, operation of the GHR at a pressure of about 90 bar with steam and methane as the reactants and a steam to active carbon ratio of about 6 results in about 30% unreacted methane remaining in the syngas product. When the syngas is processed as otherwise described herein, a waste gas stream from the hydrogen PSA system can contain substantially all the excess methane and all the carbon dioxide formed in the steam-methane reforming and the shift reactions. This waste gas can also be at about 90 bar, and can be mixed with additional methane before being passed to the oxy-fuel combustor. A circulating carbon dioxide stream at about 90 bar can be mixed with the combustion products in the oxy-fuel combustor. The flowrate can be adjusted to produce the required temperature for the heating fluid stream 156, 256 that enters the shell side of the GHR 100, 200.

An economizer heat exchanger can be used to recover the heat available from the return heating fluid stream 158, 258 that leaves the GHR reactor at a temperature in the range of about 500° C. to about 800° C., about 550° C. to about 750° C., or about 600° C. to about 700° C. This heat pre-heats the reactant feed stream 151, 251 and any additional methane and waste fuel gas for the oxy-fuel combustor plus preheating the circulating carbon dioxide stream. At the cold end of the economizer heat exchanger, the circulating oxy-fuel gas can be cooled in a direct water contact cooler where water vapor condenses, and liquid water is separated. The product carbon dioxide stream can be removed from the circulating carbon dioxide under pressure control, and the carbon dioxide stream can enter a gas circulation compressor where its pressure is raised to a range of about 1 bar to about 10 bar, about 2 bar to about 8 bar, or about 2 bar to about 5 bar to overcome pressure drop in the circulating oxy-fuel system. The syngas can be produced in the GHR 100, 200 at pressures in the range of about 10 bar to about 150 bar, about 15 bar to about 120 bar, or about 20 bar to about 100 bar. The temperature of the syngas leaving the catalyst bed can be about 600° C. to about 1000° C., about 700° C. to about 1000° C., or about 850° C. to about 950° C. Operational parameters as described herein beneficially can result in a maximum pressure difference across the walls of the assembly inner tubes 130, 230 and the assembly outer tubes 120, 220 of about 5 bar at an operating temperature of up to 1000° C., which allows the tubes to be constructed from relatively thin walled stainless steel, as previously noted above.

The produced syngas enters a steam generator to produce saturated steam required for the reformer feed, which is then superheated in the economizer heat exchanger. Optionally, extra steam can be generated from preheated boiler feed water and superheated in the economizer heat exchanger. The syngas then enters a catalytic carbon monoxide shift converter, which produces more hydrogen according to the reaction of Equation 2 above. Optionally, the temperature of the syngas following the shift converter can be increased to a temperature in the range of about 450° C. to about 600° C. in the economizer heat exchanger followed by being reduced in pressure to a range of about 15 bar to about 35 bar, or about 20 bar to about 30 bar in a turbine producing power for the process. The heat available from the turbine exhaust gas can be used to preheat the boiler feed-water required for steam generation. The syngas is then cooled, and condensed water is separated in a direct contact water cooler before the syngas enters the hydrogen PSA multi-bed adsorption system for hydrogen isolation. The hydrogen PSA in particular can be paired with a membrane unit that treats the compressed hydrogen PSA waste gas to separate a hydrogen rich permeate stream with approximately the same hydrogen concentration as the cooled syngas feed from the GHR 100, 200. The hydrogen PSA waste gas must be increased in pressure in a compressor to be used as a fuel gas in the oxy-fuel combustor, and the partial pressure of the residual hydrogen in the waste gas is high enough to allow the bulk of the hydrogen content to be removed as a permeate stream in the membrane unit. This is recycled back to the hydrogen PSA feed, and this arrangement results in a hydrogen recovery of greater than 98% based on the mass of the hydrogen present in the crude hydrogen stream leaving the direct contact cooler.

As seen from the forgoing, in various embodiments, the present disclosure can provide a reactor for carrying out a catalytic reaction between a hydrocarbon fuel and steam to produce a product gas containing hydrogen and carbon monoxide. The reactor can be configured for operation in several, various example implementations. The containment of the catalyst can be in a vertically mounted array of tubes having closed ends, with a centrally located tube through which the reaction products are withdrawn. The reaction products passing downwards through the centrally located tubes can be in a heat transfer relationship with the reacting feed gas flowing upwards through the catalyst. The catalyst can be located in a space (e.g., an annulus) defined between the assembly inner tubes and the assembly outer tubes. The catalyst can be loaded and unloaded in each tube assembly through a filling tube located in the top, closed end of the tube assembly. The outer surface of the catalyst tube can be heated by a heating fluid stream flowing counter-currently to the upward flow of the reacting gases in the sections of the tube assemblies that are filled with the catalyst. The heating fluid can be a circulating stream comprising predominately carbon dioxide that has been heated by mixing with the products of combustion of a hydrocarbon with oxygen. The reactor is mounted vertically with its hot end at the top.

In some embodiments, each tube assembly can be surrounded by an outer tube with the top inlet end open to the heating fluid which flows downwards around each tube assembly, thus providing heat to each tube assembly, and the heating fluid is collected below an outlet tube sheet. In some embodiments, the heating fluid can flow downwards around the tube assemblies, providing heat to the reacting feed gases, in a multi-pass cross-flow arrangement defined by a succession of baffle plates arranged horizontally at 90 degrees to a horizontal axis of the tube assemblies. In some embodiments, each of the tubes can be sealed into separate tube sheets, which are located at the bottom of the vertically defined reactor. The tube sheets can define the distribution space for the feed gas and heating gas and the collection space for the product syngas and cooled heating fluid. In some embodiments, the outer surface of the tube assemblies can be provided with radial fins to enhance heat transfer from the heating fluid, which is in multi-pass cross-flow arrangement flowing in a counter-current direction to the reacting feed gases. In some embodiments, the outer surface of the tube assemblies can be provided with longitudinal fins along their length to enhance heat transfer from the downward flowing heating gas. In some embodiments, the reactor pressure vessel can be internally insulated. In some embodiments, all the internal surfaces within the reactor which are exposed to partial pressures of carbon monoxide at operating temperatures where the Bouduard reaction can take place can be protected from metal dusting corrosion by the choice of a suitable metal alloy or by a protective applied coating or by a layer of internal insulation. In some embodiments, the maximum pressure difference between the inlet heating gas and the inlet gas entering the reformer catalyst filled tubes can be about 5 bar. In some embodiments, the maximum pressure difference between the inlet heating fluid and the inlet gas entering the tube assemblies can be about 2 bar. In some embodiments, the temperature of the feed gas to the tube assemblies can be the range of about 400° C. to about 600° C. In some embodiments, the product gas leaving the reactor can be in the pressure range of about 20 bar to about 100 bar. In some embodiments, the product gas leaving the catalyst bed and entering the central outlet tube can be in the temperature range of about 800° C. to about 950° C. In some embodiments, the heating gas entering the reactor can be at a temperature of about 25° C. to about 100° C. higher in temperature than the product gas leaving the catalyst bed and entering the central outlet tube. In some embodiments, the cooled heating fluid leaving the GHR can be at a temperature of about 25° C. to about 100° C. higher than the feed gas entering the tube assemblies. In some embodiments, the length of the tube assemblies can be about 6 meters to about 18 meters. In some embodiments, each of the tube assemblies can have a closed end. In some embodiments, the bottom of the space between the assembly inner tubes and the assembly outer tubes can be sealed by a porous plug to allow passage of the inlet gas and confine the catalyst. In some embodiments, the top of each of the assembly inner tubes can be sealed with a porous plug through which the product syngas flows and which confines the catalyst. In some embodiments, an extension tube can be located on the sealed top end of each tube assembly and can act as a fill and empty point for the catalyst charge in each of the tube assemblies. In some embodiments, each of the catalyst fill tubes can be provided with a spring loaded plug exerting a down-ward force on the catalyst bed in each tube assembly.

A GHR as described herein can be utilized particularly in a hydrogen production unit. A hydrogen production unit specifically can include all of the components necessary for utilizing inputs of only hydrocarbon, oxygen, and water and provide outputs of substantially pure hydrogen, carbon dioxide for use or sequestration, and excess water. The combined parts thus define a system for producing hydrogen, and the system or unit can be combined with further industrial equipment and plants so that the produced hydrogen can be used as a feed stream into the further plant. The hydrogen production unit, however, may also be operated without combination with other equipment or plants, and the hydrogen production unit may thus be operated as a standalone hydrogen production plant to export hydrogen as a product. In various embodiments, a hydrogen production unit, system, or plant can comprise the following: a GHR as otherwise described herein; an oxy-fuel combustor arranged to produce a combustion product stream that can be input to the GHR as a heating fluid; one or more shift reactors arranged to receive a syngas product that is formed in the GHR; one or more hydrogen isolation units, which is described in greater detail below and which can comprise only one or more pressure swing absorbers (PSA) or which preferably can also comprise one or more separation membranes and one or more compressors; one or more turbines arranged to expand the syngas product that is formed in the GHR and thus produce power with an associated generator; and a plurality of heat exchanger members, which can include, for example a waste heat boiler for forming steam from water, a recuperator heat exchanger, water coolers, and the like. In some embodiments, one or more pumps and/or compressors may be included for maintaining necessary operating pressures and flow rates in the system. It is likewise understood that the hydrogen production unit, system, or plant can include necessary piping, valves, and control components necessary for operation thereof.

With the above general discussion of a hydrogen production unit, system, or plant in mind, a simplified arrangement of the components thereof present in example embodiments of the present disclosure is provided in FIG. 5. This illustrates a general layout of a hydrogen production unit, system, or plant including the components discussed above. A GHR 100, 200 suitable for use in such unit, system, or plant has already been described above. Additional discussion of the operation of an oxy-fuel combustor for provision of the heating fluid stream 156, 256 that is formed with the oxy-fuel combustor for use in the GHR is provided below. Also described below are the operational and likewise beneficial aspects of utilizing a hydrogen isolation unit that includes a separation membrane and one or more compressors in combination with a PSA. Additionally, the following provides discussion of the improved functionality of the hydrogen product by implementation of compression at appropriate stages, particularly in relation to handling of the waste gas leaving the PSA, to enable combination of oxy-fuel combustion with operation of the GHR.

In various embodiments, the present disclosure can provide a process for production of a syngas (e.g., hydrogen plus carbon monoxide) gas mixture in a catalytic reforming reactor using a steam plus hydrocarbon feed in which the endothermic heat of reaction plus the sensible heat in the reaction products is provided by heat transfer from a heating fluid. The heating fluid particularly comprise predominately carbon dioxide. Predominately indicates that greater than 50% molar of the heating fluid is carbon dioxide. A stream comprising predominately carbon dioxide thus can comprise at least 55%, at least 60%, at least 65%, at least 70%, at least 75%, or at least 80% molar carbon dioxide. In some embodiments, the heating fluid stream can comprise about 55% to about 95%, about 60% to about 90%, or about 70% to about 90% molar carbon dioxide. In some embodiments, the heating fluid stream can comprise as much as 5% molar oxygen, such as about 0.1% to about 5%, about 0.5% to about 4%, or about 1% to about 2% oxygen content on a molar basis. The heating fluid stream may have no more than 5%, no more than 4%, no more than 3%, or no more than 2% oxygen molar in some embodiments. A predominately carbon dioxide heating fluid stream can comprise water, which may be liquid or may be in the form of steam. Water can comprise no more than 5%, no more than 10%, no more than 15%, or no more than 20% of the heating fluid stream on a molar basis, such as about 1% to about 30%, about 2% to about 25%, or about 5% to about 20% water on a molar basis. Further, the stream comprising predominately carbon dioxide may have a lesser water content when entering the oxy-fuel combustor than when entering the reforming reactor as the heating fluid.

The stream comprising predominately carbon dioxide particularly can be heated by the combustion of a fuel, such as a hydrocarbon, with an oxidant, which may comprise substantially pure oxygen, in an oxy-fuel combustor with direct mixing of the combustion products with the stream comprising predominately carbon dioxide. In some embodiments, the operating pressure in the catalytic reforming reactor can be in the range of about 25 bar to about 90 bar. In some embodiments, the molar ratio of steam to the carbon in the hydrocarbon in the feed can be in the range of about 3 to about 7. In some embodiments, the temperature of the steam plus hydrocarbon feeds to the catalytic reforming reactor can be in the temperature range of about 400° C. to about 600° C. In some embodiments, the reaction products leaving the catalytic reforming reactor can be in the temperature range of about 850° C. to about 950° C. In some embodiments, the oxygen entering the oxy-fuel combustor can be diluted with part of the circulating carbon dioxide heat transfer fluid to give an oxygen concentration in the range of about 20% to about 30% molar. In some embodiments, the oxygen concentration in the oxygen feed gas can be in the range of about 90% to about 99.8% molar. In some embodiments, the oxygen required for combustion of the hydrocarbon can be provided by an air stream from which the oxygen is separated by diffusion through an oxygen ion transport membrane (ITM) into the mixture of hydrocarbon and the circulating carbon dioxide. In some embodiments, the ITM combustor can comprise two ITM reactors operating in series separated by two heat exchangers with the circulating carbon dioxide feed first being preheated in the first heat exchanger to a temperature above about 800° C. against the circulating carbon dioxide leaving the first ITM combustor, then being heated to a temperature above about 800° C. in the second heat exchanger against the circulating carbon dioxide leaving the second ITM combustor, then being heated to a temperature of about 900° C. to 1100° C. in the second ITM combustor. In some embodiments, the air pressure in the ITM combustor can be in the range of about 1.1 bar to about 1.5 bar. In some embodiments, the air entering the ITM combustors can be preheated against the depleted air leaving the ITM combustors in a third heat exchanger. In some embodiments, the circulating heating fluid mixture leaving the oxy-fuel combustor and entering the catalytic reforming reactor can be at a temperature that is about 25° C. to about 100° C. higher than the syngas product leaving the catalyst and entering the syngas outlet tubes. In some embodiments, the cooled circulating heating gas mixture can leave the catalytic reforming reactor at a temperature that is about 25° C. to about 100° C. above the temperature of the steam plus hydrocarbon feed entering the GHR tube assemblies. In some embodiments, the circulating heat transfer fluid mixture can be cooled to near ambient temperature, and condensed liquid water derived from hydrogen in the hydrocarbon fuel to the oxy-fuel combustor can be separated. In some embodiments, the carbon dioxide derived from combustion of the carbon in the hydrocarbon fuel in the oxy-fuel combustor can be removed from the circulating heat transfer fluid mixture at near ambient temperature following water removal. In some embodiments, the pressure of the circulating heat transfer fluid mixture entering the catalytic reforming reactor can be less than about 5 bar different from the pressure of the syngas product leaving the catalytic reforming reactor. In some embodiments, the circulating heat transfer fluid mixture leaving the catalytic steam plus hydrocarbon reforming reactor can be used to heat the steam plus hydrocarbon feed streams to the catalytic reforming reactor inlet temperature. In some embodiments, the hydrogen plus carbon monoxide product stream from the catalytic reforming reaction can be cooled by transferring sensible heat to produce steam in a water boiler, the heating being added to the hydrocarbon stream that reacts in the catalytic reforming reactor. In some embodiments, the heating carbon dioxide plus steam stream entering the catalytic reforming reactor can be about 25° C. to about 100° C. above the temperature of the syngas stream leaving the catalyst bed and entering the assembly outlet tubes 130, 230, of the GHR 100,200. In some embodiments, the syngas product from the catalytic reforming reactor, following cooling to form steam in a waste heat boiler, followed by carbon monoxide reacting with steam in a carbon monoxide catalytic shift reactor can be heated in an economizer heat exchanger and reduced in pressure in a power producing turbine. Optionally, a second catalytic carbon monoxide shift reactor can be added to produce additional hydrogen in the turbine exhaust stream to form a crude hydrogen product stream followed by cooling to near ambient temperature with condensed liquid water separation. The crude hydrogen stream can be separated into a pure, pressurized hydrogen product stream and a waste gas stream containing all the carbon dioxide derived from the hydrocarbon feed to the catalytic reformer and which can be compressed to a pressure required for feed to the oxy-fuel combustor. In some embodiments, an additional stream of hydrocarbon can be added to the total waste gas stream to provide sufficient heat release in the oxy-fuel combustor to satisfy the total heat requirement of the GHR reactor. In some embodiments, carbon dioxide can be separated by known processes from the impure hydrogen stream following carbon monoxide shift conversion of carbon monoxide plus steam to hydrogen and carbon dioxide. In some embodiments, the waste gas from the multi-bed PSA hydrogen separation unit can be compressed, and carbon dioxide can be removed by known carbon dioxide separation processes. In some embodiments, the compressed waste gas, following carbon dioxide removal, can be separated in a second multi-bed PSA into a second hydrogen stream, which can be added to the first PSA hydrogen product stream to become the total hydrogen product stream. In some embodiments, the net product carbon dioxide stream separated from the circulating carbon dioxide heat transfer mixture by pressure control can comprise the total carbon dioxide from the carbon in the hydrocarbon streams used as feed to the catalytic reformer and the oxy-fuel heater. In some embodiments, the hydrogen product can have a total impurity level below about 100 ppm molar. In some embodiments, the hydrogen product can be used as a substitute for natural gas in applications involving domestic, commercial, and industrial heating, as fuel for gas turbine combined cycle power generation systems mixed with nitrogen from the cryogenic air separation unit, and as ammonia synthesis gas in a 3 to 1 ratio of hydrogen to nitrogen. In some embodiments, the hydrogen plus carbon monoxide gas mixture produced in the catalytic reformer can be reduced in pressure in a power producing turbine before entering the hydrogen PSA unit.

In various embodiments, the presently disclosed hydrogen production is made particularly efficient and economical though implementation of a hydrogen isolation unit. Such unit can be implemented in a hydrogen production plant and process to specifically improve the ability to remove a maximum content of produced hydrogen, which is beneficial when substantially pure hydrogen as a product is a goal of the production (i.e., as opposed to producing impure hydrogen for use as a supplemental fuel in the process). The primary hydrogen PSA produces a substantially pure hydrogen product stream, part of which is recycled back to the PSA feed in order to elevate the feed stream hydrogen concentration to above 70% hydrogen molar. This allows the relatively high concentration of carbon dioxide plus methane in the feed stream to be lowered to the point where a hydrogen recovery of 88% to 90% of the hydrogen in the PSA feed can be achieved. The PSA waste gas stream, which contains about 11% of the total hydrogen feed to the PSA together with a small quantity of carbon monoxide and a large quantity of methane, is compressed to the operating pressure of the SMR reactor, generally in the range of about 50 bar to about 100 bar. The pressure energy present in the compressed PSA waste gas elevates the partial pressure of the hydrogen fraction. This provides an opportunity to use a gas diffusion membrane to separate a large fraction, generally in the range of about 80% to about 95%, of the hydrogen present in the compressed membrane feed as a diffusing low pressure hydrogen rich permeate stream. The recovery of hydrogen is enhanced by re-cycling a small flow of pure carbon dioxide with substantially zero hydrogen content into the permeate side of the membrane unit counter-current to the waste gas flow. The hydrogen rich permeate stream is then compressed and recycled back to the hydrogen PSA feed gas stream. This combination of a single hydrogen PSA, a compressed waste gas stream and a membrane diffusion unit with the diffusing low pressure hydrogen rich stream compressed and recycled back to the hydrogen PSA feed will result in a hydrogen recovery increased from the range 88% to 90% up to 98% to 99.5%. The hydrogen depleted compressed waste gas stream containing 100% of the carbon derived from the SMR hydrocarbon feed is then mixed with a hydrocarbon and used as fuel in the oxy-fuel combustor. All the carbon dioxide derived from the total carbon in the SMR and oxy-fuel heater hydrocarbon feed streams appears as carbon dioxide product at the near ambient temperature part of the oxy-fuel recycle system, following liquid water separation, where it is removed under pressure control. The result is substantially 100% carbon dioxide capture with the carbon dioxide available at the same pressure as the reformer An example embodiment of a hydrogen isolation unit is illustrated in FIG. 6. The unit specifically provides for separation and purification of hydrogen from a mixed gas stream, such as a syngas stream. The hydrogen isolation unit includes a multi-bed pressure swing adsorber (PSA) unit 406, a membrane separation unit 446, a first compressor 442, and a second compressor 449. Th hydrogen isolation unit provides high efficiency hydrogen production from a mixed gas feed stream though combination of the PSA 406 and the membrane separation component 446 since hydrogen still present in the waste gas stream leaving the PSA 406 will be removed in a high concentration by the membrane separation component as a permeate stream that is recycled back to the PSA 406 for output through the hydrogen product stream. Preferably, the membrane separation unit 446 is effective to withdraw at least 75%, at least 80%, at least 85%, or at least 90% by weight of the hydrogen that is present in the PSA waste gas into the permeate stream.

The multi-bed PSA unit 406 can utilize a combination of multiple feed streams to provide the desired operational efficiency of the hydrogen isolation unit. The multicomponent feed gas stream 401 (e.g., syngas) is combined with a compressed permeate stream 453 that contains a high proportion of the hydrogen from the PSA waste gas stream 441, as noted above. It is also can be combined with an enhancing stream 454, which is a portion of the substantially pure hydrogen product stream 428 separated in the hydrogen PSA unit 406 before the remaining portion of the hydrogen leaves as hydrogen product stream 456. The amount of hydrogen in the enhancing stream 454 is chosen so that the final mixed feed stream 451 entering the PSA 406 has a hydrogen concentration of greater than 60% molar, greater than 65% molar, or greater than 70% molar, such as about 60% to about 95% molar, about 65% to about 90% molar, or about 70% to about 85% molar. This enhancement enables the PSA 406 to recover greater than 90%, greater than 95%, greater than 97%, greater than 98%, or greater than 99% molar of the hydrogen content in the feed gas stream 401, in certain embodiments. The total hydrogen product is produced as substantially pure hydrogen stream 428. A significant amount of the other gases present in the multicomponent feed gas stream 401 (e.g., carbon dioxide and hydrocarbon, such as methane, plus hydrogen and carbon monoxide) will then leave in PSA waste gas stream 441.

The PSA waste gas stream 441 can be compressed in a first compressor 442, preferably to a pressure that is suitable for the waste gas to be utilized for further purposes, such as delivered to a combustor in an oxy-fuel combustion process as otherwise described herein. In various embodiments, the first compressor can be configured to compress the PSA waste gas stream 441 to a pressure of at least 40 bar, at least 70 bar, or at least 100 bar, such as about 40 bar to about 140 bar, about 70 bar to about 130 bar, or about 100 bar to about 120 bar. In certain embodiments, a pressure of about 92 bar may be preferred. The first compressor 442 can be a multi-stage unit with each stage followed by a gas cooler, such as the intercooler 443. The compressed waste gas stream 444 exiting the first compressor 442 can be cooled to near ambient temperature in a cooler 451 producing compressed and cooled waste gas stream 445 at a temperature of about 15° C. to about 45° C., about 18° C. to about 40° C., or about 20° C. to about 30° C., such as about 25° C. in certain embodiments.

The stream 445 is fed into a membrane separation unit 446. The membrane separation unit can comprise any equipment configured for producing a permeate stream comprising hydrogen and a non-permeate comprising the remaining portions of the entry stream. In FIG. 6, a carbon dioxide stream 455 enters the permeate side of the membrane unit and flows counter-current to the compressed and cooled waste gas stream 445. The carbon dioxide stream 455 preferably comprises less than 1000 ppm hydrogen, less than 750 ppm hydrogen, less than 500 ppm hydrogen, less than 250 ppm hydrogen, or less than 100 ppm hydrogen (on a molar basis). The carbon dioxide stream 455 also preferably is substantially pure, including less than 1%, less than 0.5%, less than 1%, or less than 0.1% molar of any components other than carbon dioxide. The carbon dioxide stream 455 flowing counter-current to the waste gas stream 445 enables the hydrogen concentration in the retentate stream 402 to be reduced to less than 5% molar, less than 4% molar, less than 3% molar, less than 2%, or less than 1% molar. The diffusing permeate stream leaving the separation membrane 446 can be at a pressure in the range of about 1 bar to about 25 bar, about 1.5 bar to about 20 bar, or about 2 bar to about 15 bar, and this provides for an hydrogen partial pressure difference between the retentate and permeate sides of the membrane 446 to cause at least 75%, at least 80%, at least 85%, or at least 90% by weight of the hydrogen present in the cooled and compressed waste gas stream 445 to diffuse into the permeate stream 447.

The permeate product stream 447 is compressed in a second compressor 449 (which can be referenced as a recycle compressor) to a pressure that is sufficiently higher than the pressure of the mixed gas feed stream 401 to allow the discharge flow stream 450 from the second compressor 449 to pass through the cooler 542 to form stream 453 and mix with the mixed gas feed stream 401. In an example embodiments, a sufficiently high pressure may be in the range of about 10 bar to about 50 bar, about 15 bar to about 45 bar, or about 20 bar to about 30 bar, such as about 26 bar. The second compressor 449 can have an associated intercooler 448. The compressed permeate product stream 450 is cooled to a temperature of about 15° C. to about 45° C., about 18° C. to about 40° C., or about 20° C. to about 30° C., such as about 25° C. in certain embodiments in the after-cooler 452 to form cooled and compressed permeate product stream 453, which is handled as already discussed above.

As discussed in greater detail in other sections of the present disclosure, the retentate stream 402 leaving the membrane unit 446 can be used for providing part of the fuel for an oxy-fuel heater. Such use is particularly beneficial when oxy-fuel heating is combined with use of a GHR for hydrogen production. The above-described use of a membrane hydrogen concentrator with recycle to the hydrogen PSA feed is particularly enabled when the waste gas from the PSA is compressed to near the GHR operating pressure. In other words, operation of a hydrogen isolation unit, as described here in relation to FIG. 6, can be particularly configured so that the first compressor 442 (see, also compressor 11 in FIG. 7, as discussed below) will provide an output stream at a pressure that is substantially close to the operating pressure of the GHR in the associated hydrogen production system and process. The two pressure ranges preferably differ by no more than 20%, no more than 15%, no more than 10%, no mor than 5%, or no more than 2%. This particularly allows the residual retentate stream 402 (see, also, stream 46 in FIG. 7, discussed below) to be at a pressure that is required for combustion at the GHR operating pressure. The process operates with substantially complete carbon dioxide capture (e.g., at least 95%, at least 98%, at least 99%, or at least 99.9% capture by weight) from the total hydrocarbon feed in the associated hydrogen production system and process without the requirement any additional carbon dioxide removal system (e.g., scrubbers, membranes, or other, known carbon dioxide capture materials). This is achieved by cooling the circulating carbon dioxide plus water heating gas stream leaving the GHR in an economizer heat exchanger followed by a direct contact water cooler to near ambient temperature, separating condensed water, and removing the net carbon dioxide product from the circulating carbon dioxide stream under pressure control. The process also has a hydrogen recovery from the crude hydrogen feed of greater than 98% and also achieves a thermal efficiency (heating value of hydrogen/heating value of hydrocarbon feed on an LHV basis) of about 65% to about 90%, about 70% to about 85%, or about 74% to about 80%. The thermal efficiency depends on the hydrogen product pressure.

As can be seen from the forgoing, in various embodiments, a gaseous feed mixture of steam plus a hydrocarbon can be processed to produce a syngas stream comprising predominately hydrogen and carbon monoxide, together with varying quantities of carbon dioxide, steam, and methane. The syngas can be processed to achieve conversion of the carbon monoxide to hydrogen plus carbon dioxide by catalytic reaction with steam, followed by cooling and separation of condensed water in order to produce an impure hydrogen product stream, which is separated into a substantially pure hydrogen stream and a waste fuel gas stream. In some embodiments, the crude hydrogen can be passed into a hydrogen separation and purification unit producing a pressurized, substantially pure hydrogen product stream and a low pressure waste gas stream. In some embodiments, the hydrogen separation and purification unit can comprise a hydrogen multi-bed pressure swing adsorber producing a pressurized, substantially pure hydrogen stream and a low pressure waste gas stream. In some embodiments, part of the substantially pure hydrogen product from the PSA can be recycled to the PSA feed giving a total feed hydrogen concentration of about 60% to about 85% molar or about 70% to about 75% molar. In some embodiments, the waste gas can be compressed to a pressure within about 15 bar, about 10 bar, about 5 bar, or about 3 bar of the syngas supply pressure. In some embodiments, the compressed, near ambient temperature waste gas can be separated in a membrane gas separator into a pressurized retentate waste gas stream and a low pressure enriched hydrogen stream containing about 70% to about 95% of the hydrogen present in the hydrogen PSA waste gas stream. In some embodiments, a substantially pure carbon dioxide stream containing less than about 100 ppm of hydrogen can be passed through the permeate side of the membrane counter-current to the waste gas. In some embodiments, the waste gas stream from the permeate side of the membrane can be at a pressure about 2 bar to about 10 bar. In some embodiments, the waste gas stream from the permeate side of the membrane can be compressed and recycled to the hydrogen PSA feed. In some embodiments, the hydrogen plus carbon monoxide gas mixture can be supplied at pressure in the range of about 30 bar to about 100 bar. In some embodiments, the hydrogen recovery in the system can be greater than about 98% of the hydrogen in the crude hydrogen that is fed to the PSA plus membrane system. In some embodiments, the process can comprise producing the feed mixture comprising a catalytic steam plus hydrocarbon tubular reformer convectively heated by a carbon dioxide recycle gas which has been heated by direct mixing with the combustion products of the waste fuel gas from the retentate side of the membrane unit plus added hydrocarbon burning in substantially pure oxygen. In some embodiments the syngas following high temperature carbon monoxide shift reaction can be expanded to a lower pressure in a power producing turbine. In some embodiments, the substantially pure hydrogen from the PSA can be mixed with nitrogen preheated in the hydrogen plant and used as fuel gas for a gas turbine. In some embodiments, the substantially pure hydrogen from the PSA can be mixed with nitrogen as feed to an ammonia synthesis unit with heat from the hydrogen plant plus heat from the ammonia synthesis reaction providing the heat for a power unit. In some embodiments, the power system burning hydrogen can use a closed cycle carbon dioxide working fluid with a power producing turbine, a recuperator heat exchanger, and a recycle carbon dioxide compressor. In some embodiments, the use in combination of hydrogen production and hydrogen separation can be accomplished with approximately 100% carbon dioxide capture based on carbon in the total hydrocarbon feed to the process.

An example embodiment of a hydrogen production system and the associated method of operation of the system is illustrated in FIG. 7, the system including a GHR, oxy-fuel combustion, and hydrogen isolation according to the one or more embodiments of the disclosure. For clarity, the GHR is an example embodiment of a reforming reactor that is useful in the methods and systems for oxy-fuel hydrogen combustion. Thus, reference to the GHR herein is understood to implicitly include reference to a reforming reactor more broadly, unless the context expressly dictates otherwise.

With specific reference to FIG. 7, a catalytic tubular GHR arrangement 1 (having internal configurations consistent with the disclosure already provided herein in relation to GHR 100 and 200) has an inlet flow through line 60 into the feed gas inlet distribution space (element 208, FIG. 3A) between the upper tube sheet (element 229, FIG. 3A) and the lower tube sheet (element 239, FIG. 3A) so that the feed gas enters the catalyst filled space in the tube assemblies of the GHR 1. The inlet flow provides a reaction feed stream comprising steam and hydrocarbon, which preferably is a low carbon number gas, such as $C_1$ to $C_5$ hydrocarbons (individually or in a mixture), and particularly methane or natural gas. The steam and hydrocarbon preferably are provided in a molar ratio of about 2 to about 9, and preferably about 4 to about 7, such as a ratio of about 5 in certain embodiments. The reactant feed stream in line 60 preferably is at a pressure of about 30 bar to about 120 bar, and preferably about 30 bar to about 100 bar, such as a pressure of about 90 bar in certain embodiments. The temperature of the reactant feed stream can be in the range of about 300° C. to about 700° C., and preferably about 400° C. to about 600° C., such as a temperature of about 550° C. in certain embodiments.

The syngas (predominately carbon monoxide and hydrogen) that forms by the catalytic reaction of the hydrocarbon and steam in the sections of the GHR 1 tube assemblies filled with catalyst can initially have a temperature of about 600° C. to about 1000° C., preferably about 800° C. to about 1000° C., and more preferably about 850° C. to about 950° C., such as a temperature of about 900° C. in certain embodiments, when entering the assembly inner tubes (elements 130, 230, FIG. 2A and FIG. 3A) and then passes down the central bore of the assembly inner tubes and leaves the GHR arrangement 1 as stream 25 at a temperature of about 400° C. to about 800° C., preferably about 500° C. to about 700° C., such as a temperature of about 600° C., in certain embodiments. In particular, the syngas can be cooled in the assembly inner tube to a temperature that is within about 25° C. to about 100° C. of the temperature of the reactant feed stream. The syngas formed in GHR 1 can have a carbon monoxide concentration that is dependent upon the steam to combined carbon ratio of the hydrocarbon used and the temperature of the syngas leaving the catalyst and will preferably be in the range of about 2% to about 15%, about 2.5% to about 10%, or about 3% to about 8% on a molar basis, such as a concentration of about 5% molar in certain embodiments.

Stream 25 is cooled in a steam generator 4, which is further equipped with a steam separator 3 and a thermosyphon boiler feed-water circulation unit with circulating streams 27 and 26. The cooled syngas leaves the steam generator 4 in stream 57 at a pressure of about 15 bar to about 120 bar, preferably about 20 bar to about 115 bar, and more preferably about 28 bar to about 98 bar, such as a pressure of about 88 bar in certain embodiments, and a temperature of about 200° C. to about 400° C., preferably about 225° C. to about 350° C., such as about 313° C. in certain embodiments. The cooled syngas then enters a catalytic carbon monoxide shift reactor 5 where its carbon monoxide content is reduced. Preferably, the carbon monoxide shift reactor is effective to reduce carbon monoxide content in the syngas stream to no greater than 2%, no greater than 1%, or no greater than 0.5% molar. In this example embodiment, the carbon monoxide content is reduced from 5.09% to 0.27% molar. The temperature of the shifted syngas leaving in stream 56 will increase in temperature by about 10° C. to about 80° C. or about 25° C. to about 70° C., such as to a temperature of about 365° C. in this example embodiment. The outlet syngas stream 56 from the shift reactor 5 and the saturated steam stream 65 exiting the steam separator 3 are separately passed through the economizer heat exchanger 2 at an intermediate point and are both heated to a temperature of about 400° C. to about 650° C., about 450° C. to about 625° C., or about 500° C. to about 600° C., such as a temperature of about 550° C., in certain embodiments. The heated syngas leaving the economizer heat exchanger in stream 58 is expanded in a power producing turbine 7 driving an electrical generator 8 to a pressure of about 10 bar to about 40 bar, about 15 bar to about 35 bar, or about 20 bar to about 32 bar, such as a pressure of about 27 bar in certain embodiments. The turbine outlet stream 55 of the shifted and heated syngas stream is cooled in heat exchanger 23 to a temperature of about 25° C. to about 55° C., about 30° C. to about 50° C., or about 35° C. to about 45° C., such as about 40° C. in certain embodiments. This heats a boiler feed-water stream 28 received from pump 24 to a temperature of about 225° C. to about 375° C., about 250° C. to about 350° C., or about 275° C. to about 325° C., such as about 300° C. in certain embodiments, before it enters the steam separator 3 as stream 28. Alternatively, the turbine 9 driving the electrical generator 10 can be eliminated so that the high pressure syngas stream 41 can be cooled in heat exchanger 2, and the hydrogen at high pressure can be retained in the hydrogen product stream leaving the PSA 21. The boiler feed-water stream 28 from pump 24 can be heated in the economizer heat exchanger 2. The cooled syngas then enters a direct water cooled heat exchange packed column 15 to be further cooled so that condensed water leaves from the bottom of the column. The condensed water splits into water stream 31, which joins the boiler feed-water source stream 29 for input into pump 24 and water stream 32, which circulates through heat exchanger 16 by pump 20 to leaves as water stream 33 for input back into column 15. Heat is removed from the system with a cooling water stream 34 to 35 in heat exchanger 16. The total water stream entering pump 24, which includes the make-up water flow 29, is purified in a purifier such as an ion exchange unit, which is not shown.

The cooled syngas exits the packed column 15 as stream 43, saturated with water vapor at a pressure of about 20 bar to about 35 bar, about 20 bar to about 32 bar, or about 24 bar to about 30 bar, such as a pressure of 26 bar in certain embodiments, and at a temperature of about 15° C. to about 40° C., about 20° C. to about 35° C., or about 22° C. to about 28° C., such as about 25° C. in certain embodiments. Stream 43 joins with an impure hydrogen recycle stream 42 and a pure hydrogen recycle stream 70 to form combined gas stream 44, which is passed into a multi-bed hydrogen PSA (pressure-swing absorption) unit 21. The PSA unit 21 provides a substantially pure (e.g., less than 1000 ppm, less than 500 ppm, or less than 100 ppm impurity concentration) hydrogen product stream at a pressure of about 15 bar to about 35 bar, about 20 bar to about 30 bar, or about 22 bar to about 28 bar, such as about 25 bar in certain embodiments and a temperature of about 15° C. to about 35° C., about 20° C. to about 30° C., and about 22° C. to about 28° C., such as about 25° C. in certain embodiments. Part of the pure hydrogen product can be taken as hydrogen side stream 70 for being recycled back to the PSA feed stream 44 to raise the hydrogen concentration to preferably greater than 70% molar to facilitate the recovery of the large quantity of carbon dioxide and methane present in the waste flow from the PSA while maintaining high purity hydrogen recovery from the PSA. A waste gas exits the PSA unit 21 as waste gas stream 67, which is compressed in compressor 11 driven by a motor 12 to a pressure of about 30 bar to about 100 bar, about 40 bar to about 100 bar, or about 80 bar to about 100 bar, such as a pressure of about 95 bar in certain embodiments. The PSA waste gas exits the compressor 11 as stream 68 and is processed through a membrane separation unit 22, such as a polymeric membrane unit. The membrane separation unit 22 can be any membranous unit effective to separate the waste gas stream into a permeate stream, which includes residual hydrogen and may include additional impurities, and a retentate stream, which comprises the remaining components of the PSA waste gas stream, such as carbon dioxide, water, and carbon monoxide. A small, substantially pure carbon dioxide stream 71 (e.g., comprising less than 100 ppm hydrogen content) is fed into the permeate side of the membrane 22 at the retentate exit end of the membrane to promote diffusion of hydrogen to achieve the lowest partial pressure of hydrogen in the final waste product flow stream 46. The permeate stream 45 (i.e., impure hydrogen) is provided at a pressure of about 5 bar to about 15 bar, about 7 bar to about 14 bar, or about 8 bar to about 12 bar, such as a pressure of about 10 bar in certain embodiments. This stream is then compressed by a factor of about 1.5 to about 4 or about 2 to about 3 to achieve a pressure of about 18 bar to about 50 bar, about 20 bar to about 40 bar, or about 22 bar to about 32 bar, such as about 26 bar in certain embodiments in compressor 13, which is driven by a motor 14. The compressed permeate stream is provided as recycle hydrogen stream 42, which is added to the cooled syngas stream 43 exiting the column 15. The recycle hydrogen stream 42 can have approximately the same hydrogen mol fraction as the cooled syngas stream 43. This recycle system can be effective to provide a hydrogen recovery of greater than 98% of the hydrogen contained in cooled syngas stream 43. As already noted above, the combination of PSA and membrane separation can define a hydrogen isolation unit or system together with the compressors 11, 13 so that a maximum proportion of the hydrogen in the shifted syngas in cooled syngas stream 43 can be isolated as the hydrogen product stream. A hydrogen isolation unit such as this can be effective to recover at least 95%, at least 97%, or at least 98% molar of the hydrogen in the cooled syngas stream 43, such as about 95% to about 99.9%, about 96% to about 99.8%, or about 97% to about 99.5% molar of the hydrogen. The hydrogen isolation unit is further described herein in relation to FIG. 6.

A hydrocarbon fuel source 47 provides a hydrocarbon fuel stream 49 for addition to the retentate portion stream 46 of the waste gas from the PSA 21 and separation membrane 22. The hydrocarbon fuel stream 47 can be at a pressure of about 70 bar to about 120 bar, about 80 bar to about 110 bar, or about 90 bar to about 100 bar, such as a pressure of about 94.6 bar in certain embodiments to form the total fuel gas stream 50, which is heated in the economizer heat exchanger 2 to a temperature of about 400° C. to about 700° C., about 450° C. to about 650° C., or about 500° C. to about 600° C., such as about 550° C. in certain embodiments before entering the oxy-fuel combustor 6 as stream 62. There it is burned with oxygen from substantially pure oxygen stream 63, which has been preheated to a temperature of about 200° C. to about 300° C., about 215° C. to about 285° C., or about 225° C. to about 275° C., such as about 250° C. in certain embodiments using a portion of the saturated steam stream 65. In alternative embodiments, a diluted oxygen stream may be used. For example, oxygen stream 63 may be blended with a portion of the recycle carbon dioxide stream 52 to form an oxidant stream having an oxygen concentration of about 15% to about 75%, about 17% to about 50%, or about 20% to about 30% on a molar basis, the remainder substantially comprising only carbon dioxide. The diluted oxidant stream then can be heated in the economizer heat exchanger 2 to a temperature of about 450° C. to about 700° C., about 475° C. to about 650° C., or about 500° C. to about 600° C., such as about 530° C. in certain embodiments.

The combustor 6 can have any configuration recognized as useful in an oxy-fuel combustion process. For example, the combustor can be arranged so as to define an outer combustor shell 6a and a combustor liner 6b that defines internally a combustion chamber 6c. The fuel and oxidant may be injected into the combustor 6 into the combustion chamber 6c. Oxidant may also be injected through at least a portion of the liner 6b. The stream comprising predominately carbon dioxide likewise can be injected through the combustor liner. The oxy-fuel combustor 6 can be arranged to receive a first part of the stream comprising predominately carbon dioxide into a reaction zone 6e of the combustion chamber 6c and to receive a second part of the stream comprising predominately carbon dioxide into a dilution zone 6d of the combustion chamber 6c. It is understood in FIG. 7 that the combustor is not illustrated to scale and rather illustrates the presence of the component parts, which can be arranged as needed. A suitable combustor further is described in U.S. Pat. No. 10,859,264, the disclose of which is incorporated herein by reference. Additional combustor arrangements are described in U.S. Pat. No. 9,068,743, the disclosure of which is also incorporated herein by reference.

The combustion products mix with a heated recycle carbon dioxide stream 61 that has been heated in the economizer heat exchanger 2 to a temperature of about 400° C. to about 700° C., about 450° C. to about 650° C., or about 500° C. to about 600° C., such as about 550° C. in certain embodiments providing the outlet heating fluid stream 64 at a temperature of about 750° C. to about 1150° C., about 800° C. to about 1100° C., or about 1000° C. to about 900° C., such as about 950° C. in certain embodiments, which enters the top, or high temperature end, on the shell side of the GHR arrangement 1. The heating fluid stream 64 can have a carbon dioxide concentration of about 85% to about 98% molar, about 90% to about 98% molar, or about 92% to about 96% molar. The remaining fraction is preferably water, but small amounts of other impurities may be present. In particular, the heating stream 64 can have an oxygen concentration of about 0.1% to about 5%, about 0.2% to about 3%, or about 3% to about 2% on a molar basis.

The heating fluid stream 64 passes downwards in the GHR around the outer surfaces of the tube assemblies, particularly around the outer surfaces of the assembly outer tubes (120, 220) as facilitated by the baffles (155 in FIG. 2A) or the space between the assembly outer tubes and the third surrounding tubes (235 in FIG. 3A). The fluid cools as heat is provided to the tube assemblies, and it leaves the GHR 1 as return heating fluid stream through line 59 at a temperature of about 500° C. to about 800° C., about 550° C. to about 750° C., or about 600° C. to about 700° C., such as a temperature of 658° C. in the present example embodiment. It then enters the economizer heat exchanger 2 and exits as stream 53 after being cooled to a temperature of about 20° C. to about 80° C., about 25° C. to about 70° C., or about 30° C. to about 60° C., such as about 40° C. in certain embodiments. The stream 53 is passed to a purification unit. In the illustrated embodiment, the purification unit comprises a direct contact packed tower water cooler 17; however, it is understood that the purification unit can comprise further components that are effective for separating carbon dioxide from the other components of the heating fluid from the reforming reactor after cooling in the economizer heat exchanger. The water cooler 17 has a circulation system where water in stream 36 is circulated to stream 39 with a pump 19 and a water cooled heat exchanger 18 with cooling water flow 37 to 38. Excess water leaves in stream 30 to combine with boiler feed-water source stream 29. The cooled water-saturated carbon dioxide stream has a saturation water mol fraction in the range of about 0.002 to about 0.004 at 25° C. according to experimental results. Leaving the top of the water cooler is a cooled and purified stream comprising predominately carbon dioxide, stream 40. This stream 40 is compressed in a circulation compressor 9 driven by a motor 10 to a pressure of about 75 bar to about 110 bar, about 80 bar to about 100 bar, or about 88 bar to about 92 to leave as stream 41, which splits into product and recycle streams. In this manner, the stream of predominately carbon dioxide 41 is at a pressure suitable for passage through the oxy-fuel combustor 6. The net carbon dioxide product stream 51 is removed under pressure control, and the recycle carbon dioxide stream 52 enters the economizer heat exchanger 2 to be heated and passed back to the combustor 6 as discussed above. The hydrocarbon feed stream from hydrocarbon source 47 is preferably at a pressure of about 75 bar to about 115 bar, about 80 bar to about 110 bar, or about 85 bar to about 105 bar, such as about 95 bar in certain embodiments, is sent in part as reformer feed stream 48, which will be sent to the GHR 1, but a portion (stream 49) is divided out for addition to the PSA waste in stream 46 to form fuel stream 50, which will be combusted in the combustor 6. Both of streams 48 and 50 are heated to a temperature of about 400° C. to about 700° C., about 450° C. to about 650° C., or about 500° C. to about 600° C., such as about 550° C. in certain embodiments in the economizer heat exchanger 2. The reformer feed stream 48 leaves the economizer heat exchanger 2 as heated reformer feed stream 67 and is mixed with the superheated steam stream resulting from the steam stream 65 having been heated in the economizer heat exchanger, as already noted above. The mixed, steam-saturated fuel stream 60 preferably has a steam to fuel ratio of about 7 to 1 to about 2 to 1, about 6 to 1 to about 3 to 1, or about 5 to 1 in certain embodiments. The mixed, steam-saturated fuel stream 60 then enters the tube assemblies in the GHR arrangement 1 for catalytic reaction in the catalyst-filled spaces between the assembly outer tubes (120, 220) and assembly inner tubes (130, 230).

Calculations for operation of the above-described system are based on 100 lb mols methane feed to the GHR arrangement. Total methane feed at 95 bar is 125.42 lb mols. Hydrogen production at 25 bar is 313.7 lb mols. Oxygen required at 95 bar is 94.93 lb mols. There is excess heat available of 2200 Kw from a temperature of 167° C. down to 40° C., which can be used for district heating or boiler feedwater preheating in an associated steam power system, particularly when the hydrogen is used to power a combined cycle gas turbine power unit. carbon dioxide production at 94 bar is 125.42 lb mols.

While the foregoing provides discussion of preferred embodiments of the disclosure, particularly including all of the GHR assembly, oxy-fuel combustion, hydrogen isolation and compression, and other features beneficial for providing high efficiency hydrogen production, the present disclosure also encompasses other aspects whereby hydrogen production can also be achieved at desirable efficiencies and may be better utilized in certain circumstances. An example embodiment, therefore, of an additional hydrogen production process according to the present disclosure is provided below with reference to FIG. 8.

In FIG. 8, an oxy-fuel hydrogen production system is illustrated. Although the example embodiment that follows is described utilizing specific operating parameters, it understood that such operating parameters relate only to a preferred embodiments, and such parameters are subject to variation within ranges, particularly ranges otherwise described herein for operation in similar embodiments of oxy-fuel hydrogen production.

The system and process for oxy-fuel hydrogen production that is illustrated in FIG. 8 can preferably produce hydrogen at a pressure of about 28 bar. Note that the GHR 50 is shown inverted for simplicity. The oxy-fuel hydrogen production process includes a low temperature carbon dioxide removal step on the pressurized syngas after cooling to near ambient temperature in the direct water contact tower 56. This limits the carbon dioxide concentration in the PSA feed and allows a high enough hydrogen content in the pressurized vent gas stream 91 leaving the carbon dioxide removal unit 68 for the stream 91 to be processed in a second small PSA unit 69 producing an additional pure hydrogen product stream 89 and a final waste gas stream 88. The separate removal of carbon dioxide and hydrogen from the waste stream 88 means that it can be re-compressed and recycled back to the GHR catalytic reformer with additional hydrocarbon feed.

With reference to FIG. 8, the GHR 850 has a feed stream 897 at about 32 bar and about 550° C. comprising a mixture of fresh methane stream 895 plus waste gas stream 888 from a second stage PSA 869 which has been compressed to about 32 bar in compressor 870 with motor drive 871. The two streams are separately heated in heat exchanger 854, the waste gas to a temperature of about 140° C., which is about 5° C. colder than the dew-point of the cooling syngas product stream 884, which passes from the low temperature shift reactor 855 into heat exchanger 854 at about 257° C. The methane stream is heated to a temperature of about 250° C. The two exit streams 8110 and 896 are heated to about 550° C. in heat exchanger 877 against the cooling circulating carbon dioxide heat transfer stream 8116, which enters heat exchanger 877 at about 620 167C. A stream of methane 8100 is separated from the 550° C. methane stream and enters the oxy fuel combustor 878 together with the 25% oxygen plus 75% carbon dioxide molar oxidant stream 898 and the carbon dioxide circulating stream 899 which have both been heated in 877 to about 509° C. The heated circulating carbon dioxide stream 8115, which is a mixture of combustion products and the circulating carbon dioxide stream, enters the GHR 850 at about 950 167C. The remaining methane plus the heated waste gas streams then mix with the 32 bar, 550° C. steam stream 8109, which has been produced from the waste heat boiler (WHB) 851 and the steam separator 852 as stream 8108 and superheated in heat exchanger 877.

The product syngas stream 879 at about 600° C. leaving the GHR is cooled to about 330° C. in the WHB 851 leaving as stream 880 to enter the high temperature shift reactor 853 where its temperature rises to about 425° C. and then cooling to about 257° C. in a second pass through the WHB 851 leaving as stream 882 to enter heat exchanger 854. The syngas cools to about 210° C. then leaves as stream 883 and enters the low temperature shift reactor 855 before leaving at a temperature of about 260° C. as stream 884, re-entering heat exchanger 854. The syngas leaves heat exchanger 854 as stream 885 at about 40° C. and is cooled to about 25° C. in the direct contact water cooler 856, which has a circulating water pump 858 and a cooling water heat exchanger 857. The outlet water stream 8120 derived from the oxidation of hydrogen in the total methane feed stream 895 is sent to a water treatment system 860. The outlet stream 886 is separated in the first PSA unit 861 into a hydrogen product stream 887 at about 28 bar and a 1.2 bar waste gas stream 8118 which is raised to about 40 bar pressure in compressor 863 driven by motor 862. The compressed waste gas stream 8119 is dried in a dual bed thermally regenerated drier 867 using nitrogen gas, then stream 8120 enters the low temperature carbon dioxide removal unit 868. The separated carbon dioxide streams 892 enter the multi-stage compressor 864 with intercooling together with the carbon dioxide from the oxy-fuel combustion of methane, stream 8121. The product stream from the compressor at about 75 bar is cooled to near ambient temperature by water cooler 894, and the resulting high density supercritical carbon dioxide is increased in pressure to about 200 bar in a multi-wheel centrifugal pump 866, delivering the carbon dioxide product stream 893 for pipeline transportation. The uncondensed waste gas stream 891 at about 39 bar pressure containing about 67.6% hydrogen is separated in the second PSA unit 869 into a second hydrogen product stream 889 at about 38 bar and a waste gas stream 888 at about 1.2 bar, which enters the compressor 870.

The cooled circulating carbon dioxide steam 8117 leaving heat exchanger 877 at about 40° C. is cooled to 25° C. in the direct contact water cooler 874, which has circulating water pump 875 and a cooling water heat exchanger 876. The cooled carbon dioxide stream 8102 is compressed in the gas circulation compressor 872 driven by motor 873. The net product carbon dioxide from the oxy-fuel combustion is removed as stream 8121 from the compressor discharge stream 8103. This stream divides into a portion which, with added oxygen stream 8111, form the oxidant stream 8112 entering the heat exchanger 877. Part of this, stream 8113, is heated to about 140° C., stream 8114, in heat exchanger 854 against cooling syngas product and then rejoins the circulating oxidant stream in heat exchanger 877 where the combined stream is heated to about 550° C. The net condensed water from the direct contact coolers 856 and 874, streams 8120 and 8162 plus the water feed stream 8103 are purified in the water treatment unit 860. The total pure water stream 8105 is pumped to about 35 bar pressure in the boiler feed-water pump 859, heated in the heat exchanger 854 to about 232° C. as stream 8107, and sent to the steam separator 852 as boiler feed water for the WHB 851.

The syn-gas stream 884 from the low temperature shift converter 855 cools in heat exchanger 854 to its dew-point at a temperature of about 150° C., which is a pinch point temperature in the heat exchanger. The syngas cooling from about 150 C results in a very large additional amount of heat being available as the 15.9% of residual steam content in the syngas condenses. Additionally, there is a similar amount of heat available from the cooling carbon dioxide circulating heat transfer stream, with about 6% steam content condensing below its dew point temperature of about 117° C. in heat exchanger 877. Taking these two streams together, this heat can be used for heating a circulating pressurized water flow to about 133° C., which is an ideal temperature level for district heating to replace natural gas or oil currently used. An alternative or additional use would be to preheat the hydrogen product to about 133° C. prior to its use as fuel in either new or existing gas turbines converted to burn a 60% hydrogen plus 40% nitrogen fuel gas or for ammonia production.

In some embodiments, air can be utilized as the oxidant for combusting the hydrocarbon fuel and waste gas provided into the combustor. Likewise, a gas turbine exhaust stream, which generally contains about 11% to about 13% oxygen and is available at a temperature of about 400° C. to about 650° C., may be used as the oxidant. This can eliminate the need for an ASU and substitutes a gas turbine, which acts as a topping cycle on the combustor and actually increases the process efficiency for the hydrogen production. A gas turbine can be integrated with a catalytic steam plus hydrocarbon reformer to produce a hydrogen product. The reformer can be a GHR arrangement as already described above. In the GHR arrangement, the syngas product formed by catalytic reaction of steam and hydrocarbon fuel flows down the assembly inner tubes (elements 130 and 230 in FIG. 2A and FIG. 3A, respectively), which extend to the end of the catalyst filled outer tubes, in counter-current heat transfer relationship with the catalyst filled tubes to provide part of the required heat for the endothermic reactions. The remaining heat must be provided by a heating fluid which passes over the outer catalyst filled tube.

In each case considered, the gas turbine fuel provided is a hydrocarbon, such as methane or LPG or light naptha, at a pressure required by the chosen gas turbine. The substantially pure, pressurized hydrogen product produced by the reformer process is delivered from a multi-bed pressure swing adsorption unit, which also produces a low pressure waste fuel gas, which contains all the carbon in the reformer hydrocarbon feed, predominantly as carbon dioxide, but also with some unconverted carbon monoxide and methane. This waste fuel is typically at a pressure of about 1.1 bar to about 1.3 bar. This low pressure fuel gas can be burned using oxygen contained in the gas turbine exhaust to produce a temperature in the burner exhaust in the range of about 1000° C. to about 1200° C. The quantity of waste fuel gas burned reduces the oxygen content of the burner exhaust to about 3% to about 6% of the oxygen content in the exhaust leaving the gas turbine. The combustion of the PSA waste gas, which will contain all the carbon derived from the methane reformer feed, together with additional methane to use all the available oxygen present in the gas turbine exhaust, will result in a high temperature gas comprising carbon dioxide plus nitrogen and steam with about 1% to about 2% oxygen. The burner exhaust has a carbon dioxide concentration of about 20% to about 30% compared to the 3% to 4% content in the gas turbine exhaust. The waste fuel gas can be burned in the gas turbine exhaust in a grid type burner to uniformly heat the gas turbine exhaust. This arrangement can utilize the waste fuel at the delivery pressure of the hydrogen PSA unit, or very close to this pressure. The quantity of waste fuel gas burned defines the maximum hydrogen production of the reformer unit since the maximum quantity of available oxygen in the gas turbine exhaust has been used to support the combustion.

In the first case considered, the heat delivered by the heated gas turbine exhaust is used to heat a recycle carbon dioxide stream which, in turn, provides heat for the reformer. In the second case, the heated gas turbine exhaust is used directly as the heating fluid in the catalytic steam plus hydrocarbon reformer. In each case the gas turbine exhaust, following the reformer heating, is used to provide heat both for preheating the hydrocarbon feed gas for the reformer feed, the waste fuel gas, producing the excess steam required for the reformer, and to superheat the total steam flow to the reformer. The gas turbine exhaust, following reformer heating, also produces steam for power production and for heating in the amine carbon dioxide removal unit, which receives the gas turbine exhaust leaving the heat exchange section. The heating medium is the heat produced by burning the PSA waste gas plus optionally additional hydrocarbon fuel to consume the remaining oxygen in the hot gas turbine exhaust leaving only about 1% to about 2% residual oxygen concentration. In the first case, the hot combustion gas is used to heat a pressurized circulating carbon dioxide stream to a temperature in the range of about 900° C. to about 1050° C. The circulating carbon dioxide stream provides the heat for the catalytic steam plus methane endothermic reactions in the gas heated reformer plus preheat for the reactants. The pressure of the circulating carbon dioxide stream can be in the range of about 25 bar to about 100 bar. The pressure is within about 5 bar of the pressure at the inlet to the catalyst filled reformer tubes.

An example embodiment illustrating the first case is shown in FIG. 9. The illustration provides the details of the gas turbine, the use of the waste gas as fuel in a burner, and the circulating fluid stream that is heated to provide the heating fluid stream for the reforming reactor. Further elements useful in such embodiments may be immediately recognized in light of the additional disclosure herein, such as in relation to the systems and methods described in relation to FIG. 7 and FIG. 8, as well as the further discussion of the GHR arrangements above. Likewise, operating parameters described below reference the illustrated example embodiment, but it is understood that parameters already described herein in terms of ranges would likewise apply to the example embodiment discussed below. For example, input and output pressures and temperatures for the reforming reactor may be in any of the ranges already described above.

With reference to FIG. 9, a gas turbine is shown receiving an inlet air flow 371 with a turbine section 356 driving a compressor section 354 and an electric generator 372 and with a combustor 355 receiving a pressurized hydrocarbon fuel stream 334. The gas turbine chosen for this example is a Siemens SGT-800 which has a net power at iso conditions of 62.5 Mw with an LHV efficiency of 41.4% an exhaust temperature of about 596° C. and an exhaust flow of about 135.5 Kg/second, but it is understood that such equipment is described for illustrations purposes of this example embodiment. The fuel used in this example is methane, but other fuels may likewise be used. The gas turbine exhaust 342 enters a combustor 307 (e.g., a grid burner), which extends across the gas turbine exhaust duct in which a fuel gas stream 337 at a pressure of about 1.1 bar is burned using oxygen in the gas turbine exhaust, which enters at a concentration of about 11.6% molar in this example, although other concentrations as already noted above may be utilized. About 95% of the oxygen is consumed in the burner 307.

The gas turbine is integrated with a reforming reactor 301. The fuel gas stream 337 is the waste gas from a multi-bed pressure swing hydrogen separation unit 336, which processes the cooled crude hydrogen stream 341 from the reformer 301. Such hydrogen separator 336 may be arranged as already described herein. A substantially pure hydrogen product stream 390 and water stream 391 exit the separator along with a waste gas stream 392. The waste gas from the hydrogen separator contains all the carbon present in the hydrocarbon feed to the reformer, predominantly as $CO_2$ but also present in unconverted hydrocarbon and carbon monoxide, and this carbon appears in the burner exhaust 343 as carbon dioxide together with the carbon dioxide produced in the gas turbine combustor 355. The burner exhaust 343 enters a heat recovery heat exchanger 308 at a temperature of about 1100° C. and heats a closed cycle heating gas carbon dioxide stream 339, which enters at about 270° C. and about 32 bar and leaves as stream 340 at about 950° C. Stream 340 enters the reforming reactor 301 as a heating fluid that functions as already described above to provide the heat required to perform the endothermic reforming reactions and leaves the reactor as stream 382 at about 625° C. and about 31 bar. Stream 382 of the heating fluid leaving the reforming reactor 301 cools in the heat exchanger 305, providing the heat for preheating any number of additional streams as already described herein.

The recycle carbon dioxide stream 382 cools to about 270° C. and leaves the heat exchanger 305 as stream 338 at about 31.25 bar and enters a circulation compressor 324 driven by a motor 325. The heat exchanger 305 provides the preheating for the fuel gases and steam requirements. The hydrogen separator waste fuel gas stream 326, for example, is heated to about 550° C. and leaves as stream 337 before entering the duct burner 307. In some embodiments, extra heat can be provided by diverting a portion of the heated recycle carbon dioxide stream 340 adding it to the recycle carbon dioxide stream 382 before it enters the heat exchanger 305. The gas turbine exhaust stream 344 can be process for further treatment as needed and as would be understood in the power production field.

In the first case, then, it can be seen that a heating gas can be provided in relation to heat transfer from a deoxidized hot discharge gas from a gas turbine to a circulating carbon dioxide stream as an alternative to heating the circulating carbon dioxide by combusting fuel in pure oxygen at high pressure. In particular, the heating fluid can be a circulating stream of predominately carbon dioxide that can be heated by indirect heat transfer by the exhaust from a gas turbine, which exhaust has been increased in temperature by using the residual oxygen in the gas turbine exhaust as an oxidant to combust a fuel gas comprising the low pressure waste gas from the PSA, optionally combined with additional hydrocarbon. The cooled gas turbine exhaust can be treated as necessary for carbon dioxide removal.

The second case uses the hot combustion gas to directly heat the catalyst tubes. This means a much higher pressure difference across the catalyst tube wall than the first case, which limits the operating pressure at the inlet to the catalyst tubes to a range of about 25 bar to about 35 bar and means that thick walled high nickel tubes such as HK40 must be used. This makes the direct use of the deoxidized gas turbine exhaust as a heating gas far less attractive than the use of the recycle high pressure carbon dioxide heating gas heated by the gas turbine exhaust. It enables the use of the GHR compact catalytic reformer already described, which will have a far lower cost than the directly heated reformer, which has a low pressure heating gas with a much lower heat transfer coefficient resulting in much greater heat transfer area required and with expensive catalyst tubes. As such, the direct heating case is less preferred. In each case, the hot gas turbine exhaust following the reformer heating is used to preheat the steam and hydrocarbon feed streams to the reformer and to provide heat required for regeneration of the chemical solvent used in the carbon dioxide recovery unit.

Although non-preferred, the direct heating of the GHR is a possible route for providing oxy-fuel hydrogen production, and such direct heating route can be carried as follows. A gas turbine can receive an inlet air flow with a turbine section driving a compressor section and an electric generator and with a combustor receiving a pressurized hydrocarbon fuel stream 334. The gas turbine may be, for examples a Siemens SGT-800, which has a net power at iso conditions of 62.5 Mw with an LHV efficiency of 41.4% an exhaust temperature of 596° C. and an exhaust flow of 135.5 Kg/second (e.g., using methane as a fuel). The gas turbine exhaust enters a grid burner, which extends across the gas turbine exhaust duct in which a fuel gas stream at a pressure of 1.1 bar is burned using oxygen in the gas turbine exhaust, which enters at a concentration of 11.6% molar. Approximately 95% of the oxygen is consumed in the burner. The gas turbine is integrated with a catalytic steam plus methane tubular gas heated reformer (GHR) as already described herein. The fuel gas stream is the waste gas from a multi-bed pressure swing hydrogen separation unit, which processes the cooled crude hydrogen stream from the reformer. The product reformed hydrogen plus carbon monoxide gas stream at 30 bar 650° C. leaving the reformer reactor enters a processing section comprising waste heat boiler producing near saturated high pressure steam, two stage carbon monoxide shift reactors, heat exchangers for heat recovery, final direct contact water cooler plus condensed water separator stream followed by the PSA unit producing the substantially pure hydrogen product stream. Such components may be selected from materials that are recognized as useful in catalytic reforming processes producing substantially pure hydrogen. The carbon monoxide catalytic shift reactors convert about 95% of the carbon monoxide in the syngas produced in the reformer reactor by reaction with excess steam producing hydrogen plus carbon dioxide. The waste gas from the PSA contains substantially all the carbon present in the methane feed to the reformer, predominantly as carbon dioxide but also present in unconverted methane and CO, and this carbon appears in the burner exhaust as carbon dioxide together with the carbon dioxide produced in the gas turbine combustor and carbon dioxide produced from the combustion of an additional methane fuel gas stream taken from the methane feed stream.

The burner exhaust enters a section of the heat recovery heat exchanger at a temperature of about 1100° C. The inlet temperature is reduced to about 1100° C. by means of a recycle quench gas stream, which is taken from the gas turbine exhaust as stream and increased in pressure in the blower. The first section heats a closed cycle heating gas carbon dioxide stream, which enters at about 270° C. and 32 bar and leaves at about 950° C. before entering a catalytic steam plus methane reformer where it provides the heat required to perform the endothermic reforming reactions and preheat the reaction products leaving the reactor at about 625° C. and 31 bar. The recycle stream then cools in the economizer heat exchanger providing the heat for preheating the methane feed and superheating the steam feed and the feed water stream to produce the mixed the reformer methane plus water feed stream at about 31 bar and about 550° C. plus heating the PSA waste gas stream and the additional methane combustion stream to about 550° C.

The design of the gas heated tubular reformer reactor with its concentric tube arrangement and three tube sheets has been described above and illustrated in FIG. 2A, FIG. 2B, FIG. 3A, FIG. 3B, and FIG. 4. These three tube sheets define, in order, a space for the collection of the syn-gas product, a space for the inlet of the combined methane plus water stream at about 31 bar and about 550° C. with a molar ratio of water to methane of about 4 to 1 and a space for the outlet circulating carbon dioxide stream at about 31 bar and about 625° C., which enters a multi-channel compact heat exchanger. The recycle carbon dioxide stream cools to about 270° C. leaving about at about 31.25 about bar and enters a circulation compressor driven by a motor. The heat exchanger provides the preheating for the fuel gases and steam requirements. The heat exchangers and carbon monoxide shift reactors, converting carbon monoxide by reaction with excess steam to carbon dioxide and hydrogen produce the following feed streams which are pre-heated in heat exchanger. The methane total feed steam is at about 33 bar and about 250° C. and leaves at about 550° C. This stream is combined with the superheated steam stream at about 550° C. to form the feed stream to the reformer with a molar ratio of steam to methane of about 4 to 1.

The PSA waste fuel gas stream plus additional methane stream provide a total stream at about 1.5 bar and about 250° C. and is heated to about 550° C. before entering the duct burner. The boiler feed water at about 232° C., which produces a portion of the total superheated steam flow, which is mixed with heated methane to provide the feed stream for the reformer 301. The heat required for these preheating duties in the heat exchanger is greater than the heat available in the cooling recycle stream leaving the reformer. The extra heat is provided by diverting a portion of the heated recycle carbon dioxide stream at about 950° C. and adding it to the recycle carbon dioxide stream before it enters the heat exchanger. Alternatively, the stream can be taken as a side-stream from the heating carbon dioxide recycle stream in the heat exchanger at about 625° C.

The gas turbine heat exchanger section has an inlet stream of gas turbine exhaust at about 270° C., which contains the combustion products from the duct burner. It heats a feed water stream and generates a stream 37 at a pressure of about 3.5 bar. This provides the steam flow to which is added the steam production from the hydrogen plant required for the total 3.5 bar steam flow for regeneration duty in the amine carbon dioxide separation unit. The gas turbine exhaust stream at about 100° C., leaving the heat recovery heat exchanger, enters a direct contact water cooler where it is cooled to about 20° C., and the bulk of the water formed in the gas stream is condensed and removed for treatment. The dried gas is compressed from about 0.95 bar to about 1.5 bar in the compressor driven by a motor. At least 95% of the carbon dioxide in the gas turbine exhaust, which is 95% of the carbon in the total feed to the system, is removed as a substantially pure carbon dioxide stream at an average pressure (two streams at different pressures are available) of about 2 bar and the final waste gas stream is discharged to the atmosphere. The carbon dioxide product is compressed to about 70 bar in a multistage compressor driven by the motor 314 and leaves to enter a cooler where its temperature is reduced to about 25° C. The pressure is reduced to about 6 bar in a valve producing a saturated liquid carbon dioxide product stream at about 6 bar and a recycle flash gas stream at about 6 bar, which is recycled to the compressor.

In one or more embodiments, the present disclosure can provide for oxy-fuel hydrogen production incorporating a gas turbine in combination with a catalytic reformer (GHR) using steam plus hydrocarbon as a reactant stream. The reformer catalyst filled tubes can be heated by an external gas flow. At least part of the heat required to heat the external gas flow can be produced by burning the waste gas from a multi-bed pressure swing adsorber, which purifies the hydrogen product gas from the reformer in the gas turbine exhaust.

The oxygen required for combustion of the PSA waste gas can be taken from the exhaust from a gas turbine. The waste gas from the PSA can be burned in the gas turbine exhaust, optionally with additional methane. The oxygen content of the gas turbine exhaust after combustion can be about 1% to about 2% molar. The heated gas turbine exhaust can be used to heat a circulating gas stream, which heats the catalyst filled reformer tubes in the GHR. The deficiency in the heat available when using only the waste hydrogen PSA waste gas burning with the maximum available quantity of oxygen present in the gas turbine exhaust compared to the heat required by the hydrogen plant can be remedied by adding additional hydrocarbon to fuel gas used in the combustor. The carbon dioxide present in the gas turbine exhaust leaving the heat exchangers can be separated in a physical or chemical absorption process recovering at least 95% of the carbon dioxide present in the gas turbine exhaust. Any heat required for solvent regeneration in the carbon dioxide removal process can be provided using heat present in the deoxidized gas turbine exhaust.

In one or more embodiments, hydrogen production according to the present disclosure can be achieved with additional increased efficiency by implementing options that can eliminate the need for high energy input components, such as an air separation unit (ASU) for generating substantially pure oxygen for the oxy-fuel combustor that is used to produce the heating fluid stream for the GHR arrangement. In some embodiments, this can be achieved by use of one or more ion transport membrane units.

The general arrangement of an ITM oxy-fuel combustor and carbon dioxide recycle heater is shown in FIG. 10. Oxygen for the combustion is provided from a preheated air stream at near atmospheric pressure by diffusion of the oxygen molecules through an oxygen ion transport membrane (ITM) operating in a temperature range of about 800° C. to about 1050° C. An inlet flow of a circulating recycle carbon dioxide stream 1212 (corresponding to stream 61 in FIG. 7), mixes with a part 1228 of a preheated hydrocarbon gas plus total waste fuel gas stream 1226 (corresponding to stream 62 in FIG. 8). Both of these streams are at a temperature in a range of about 400° C. to about 700° C., about 450° C. to about 650° C., or about 500° C. to about 600° C., such as about 550° C. in certain embodiments and a pressure in the range of about 15 bar to about 1340 bar, about 20 bar to about 120 bar, or about 25 to about 100 bar.

The mixed stream 1227 enters a heat exchanger 1202 where it is heated to a temperature of about 700° C. to about 1000° C., about 725° C. to about 900° C., or about 750° C. to about 850° C., such as about 800° C. in certain embodiments. The outlet stream 1213 enters a first ITM combustion unit 1207. The noted inlet temperature ensures that a rapid diffusion of oxygen occurs through the oxygen ion transport diffusion membrane 1210. The diffusing oxygen comes from an air stream 1221 at a pressure of about 1 bar to about 2 bar, such as about 1.5 bar, and a temperature of about 600° C. to about 900° C., about 625° C. to about 800° C., or about 650° C. to about 750° C., such as about 700° C. in certain embodiments, which is part of the heated air stream 1219 leaving the recuperative air heat exchanger 1203. The air stream 1221 enters the air side of the first ITM combustion unit 1207. It is heated convectively by heat transfer through the ITM membrane 1210 as it passes through the unit 1207. Oxygen diffuses through the ITM 1210, and the depleted air stream 1222 leaves the first ITM combustor air side at a temperature of about 800° C. to about 1000° C., such as about 875° C. in certain embodiments. The stream 1222 will have been depleted of about 50% to about 80%, about 60% to about 80%, or about 70% to about 80% molar of the contained oxygen, which will have diffused through the membrane 1210. The diffusing oxygen reacts with the hydrocarbon (e.g., methane) in the recycle carbon dioxide stream, which can be at a pressure of up to about 50 bar up to about 75 bar, or up to about 100 bar, and the heat produced raises the temperature of the mixture of carbon dioxide recycle flow and carbon dioxide plus water combustion products.

The heated recycle carbon dioxide stream 1214 leaves the first ITM combustor 1207 at a temperature of about 800° C. to about 1100° C., about 850° C. to about 1050° C., or about 900° C. to a about 1000° C., such as about 950° C. in certain embodiments and enters the heat exchanger 1202 where it cools to a temperature of about 25° C. to about 100167 C greater than the inlet temperature of stream 1213, and it leaves as stream 1236. This carbon dioxide recycle stream enters heat exchanger 1230 where it is heated to a temperature of about 650° C. to about 950° C., about 700° C. to about 900° C., or about 750° C. to about 850° C., such as about 800° C. in certain embodiments and exits as stream 1235. Heating is taken from the outlet carbon dioxide recycle stream 1216 leaving the second ITM combustor 206 at a temperature of about 800° C. to about 1300° C., about 900° C. to about 1200° C., or about 950° C. to about 1150° C., such as about 1050° C. in certain embodiments, which itself is cooled to a temperature of about 800° C. to about 1100° C., about 850° C. to about 1050° C., or about 900° C. to about 1000° C., such as about 950° C. in certain embodiments, and it leaves heat exchanger 1230 as exit stream 1234, which is equivalent to stream 64 in FIG. 7.

Stream 1235 mixes with the remaining portion of the hydrocarbon and waste fuel gas feed stream 1229, and the mixed stream 1215 enters the second ITM combustor 1206. The diffusing oxygen for combustion comes from an air stream 1220 at a pressure of about 1 bar to about 2 bar, such as about 1.5 bar, and a temperature of about 600° C. to about 900° C., about 600° C. to about 800° C., or about 650° C. to about 750° C., such as about 700° C. in certain embodiments, which is part of the heated air stream 1219. This air stream enters the air side of the ITM combustor 1206 and the depleted air stream 1223 leaves at a temperature of about 900° C. to about 1100° C., about 850° C. to about 1050° C., or about 900° C. to about 1000° C., such as about 950° C. in certain embodiments. The recycle air stream heats by convective heat transfer through the ITM membrane 1211 as it passes through the ITM membrane unit 1206. The depleted air stream 1223 leaving the air side of the second ITM combustor 1206 is joined by stream 1222 from the first ITM combustor 1207, and the total stream 1224 enters the air recuperative heat exchanger 1203. There it cools to a temperature of about 40° C. to about 110° C., about 50° C. to about 100° C., or about 60° C. to about 90° C., such as about 75° C. in certain embodiments and is vented to the atmosphere as stream 1225.

An adiabatic air compressor 1204 driven by a motor 205 with an inlet air flow 1207 delivers an air stream 1218 at a pressure of about 1.2 bar to about 5 bar, about 1.2 bar to about 3 bar, or about 1.2 bar to about 2.5 bar, such as about 1.7 bar in certain embodiments and at a temperature of about 35° C. to about 95° C., about 45° C. to about 85° C., or about 55° C. to about 75° C., such as about 65° C. in certain embodiments. The air stream 1218 is sent to the air recuperative heat exchanger 1203 where it is heated to a temperature of about 500° C. to about 900° C., about 600° C. to about 800° C., or about 650° C. to about 750° C., such as about 700° C. in certain embodiments. The recycle carbon dioxide stream leaving as stream 1234 then enters the GHR arrangement in any of the further embodiments of a hydrogen production system that are described herein to function as the heating fluid stream. The performance of the two stage ITM combustion system can be maximized by operation of a control system in which the hydrocarbon and air flows to each ITM combustor 1206, 1207 are flow controlled to achieve the specified temperatures in the system.

As can be seen from the forgoing, the oxy-fuel combustion aspect of hydrogen production as described herein can be provided in a variety of manners. Combustion can specifically be carried out in a conventional combustor into which a hydrocarbon fuel is injected to be combusted with oxygen that has been separated from air to avoid introducing any nitrogen into the system. Combustion is carried out in the presence of a stream of carbon dioxide to produce a combustion exhaust stream comprising predominately carbon dioxide with a content of water and potentially small fractions of one or more impurities. This type of oxy-fuel combustion is described above in relation to the hydrogen production systems and methods illustrated in FIG. 5, FIG. 7, and FIG. 8. It is thus understood that such figures and their related disclosure expressly describe oxy-fuel combustion in a conventional combustor with purified oxygen to form a heating fluid stream that is configured to be added to a GHR arrangement for heating the tube assemblies in which hydrocarbon fuel and steam are catalytically reacted to form syngas. Such figures and their related disclosure are not, however, limited to only the use of the conventional combustor that is described. Rather, it is expressly understood that the conventional combustor (e.g., the labeled unit in FIG. 5, element 6 in FIG. 7, and element 78 in FIG. 8) may be replaced with an ITM unit as described above in relation to FIG. 10. In such embodiments (e.g., a combination of the ITM unit of FIG. 10 with any of the oxy-fuel hydrogen production systems of FIG. 5, FIG. 7, or FIG. 8) the need for an ASU is eliminated since plain air can be utilized as the oxygen source input to the oxygen side of the ITM combustion units 1206, 1207 and since the oxygen will selectively diffuse across the ITM membranes 1210, 1211 in the ITM combustion units 1206, 1207 to combust the hydrocarbon fuel passed through the fuel sides of the units. When implementing the ITM combustion unit, power consumption required for operating the hydrogen production plant can be reduced by at least 25%, at least 35%, or at least 45%, such as about 25% to about 75%, about 35% to about 65%, or about 45% to about 55% relative to an identical hydrogen production plant using a conventional combustor and an ASU to provide the purified oxygen.

A typical ITM membrane suitable for use as discussed above may comprise mixed metal oxides arranged in a perovskite crystal structure. A mixture comprising carbon dioxide and a gaseous hydrocarbon fuel, such as methane and PSA waste gas, can be passed through the permeate side of the ITM membrane at high pressure in the range of about 20 to about 100 bar. Diffusion will take place due to the extremely low equilibrium partial pressure of oxygen on the permeate side with oxygen reacting with the hydrocarbon at the ITM operating temperature. The result is a process with 100% capture of carbon dioxide derived from the carbon present in the hydrocarbon feeds to both the syngas generation and the oxy-fuel combustion.

Hydrogen produced as described herein can be delivered for a variety of end uses. As a non-limiting example, hydrogen mixed with nitrogen can be used as a fuel, replacing or supplementing natural gas, in a gas turbine combined cycle power unit. The molar fuel gas composition can be, for example, about 60% hydrogen plus about 40% nitrogen. Performance can be based on the production of hydrogen at about 25 bar pressure and about 25° C. with purity of about 99.995% mixed with nitrogen with a purity of about 99.999%. Conversion of a GE combined cycle power system comprising two GE 9HA-02 gas turbines with a single steam system and using the same heat input for the hydrogen fuel gas as the natural gas, for following conditions are achieved: net power output (iso conditions) is about 1681 Mw; heat rate is about 5306 Btu/Kwhr Net; Hydrogen required is about 826756 $Nm^3/hr$; nitrogen required is about 551171 $Nm^3/hr$; oxygen required is about 8486.9 Mt/day; carbon dioxide production (methane fuel) is about 15573.6 Mt/day; efficiency is about 51.14%. Note that the oxygen requirement is 0.2104 Metric tons/Mwhr compared to a supercritical carbon dioxide cycle power requirement of about 0.54 Mt/Mwhr.

As a further non-limiting example of hydrogen use, the hydrogen produced according to the present disclosure can be blended with nitrogen to give an approximate 25% nitrogen plus 75% hydrogen synthesis gas at about 25 bar and about 25° C. for ammonia production. The total impurity in the synthesis gas can be less than about 50 ppm. The ammonia loop can operate with no purge gas bleed from the loop eliminating the purge gas purification system. The excess low grade heat below about 300° C. available from the hydrogen system can be used with the excess heat produced in the ammonia synthesis reactor to provide heat for power production. Power can be produced by transferring this heat to a high pressure circulating carbon dioxide stream that is then passed through a power producing turbine. The high temperature turbine exhaust can be cooled in a recuperator heat exchanger then compressed to the turbine inlet pressure and heated in the recuperator heat exchanger. The advantage of using a carbon dioxide working fluid rather than steam is the absence of a temperature plateau as boiler feed water is evaporated in a steam system. The oxy-fuel hydrogen system can have a heat recovery economizer heat exchanger that has a significant quantity of heat available below a temperature pinch in the range of about 250° C. to about 300° C. This excess heat is available for preheating the compressed 75% hydrogen plus 25% nitrogen syngas feed to the ammonia loop and also for preheating the recycle carbon dioxide. A significant quantity of excess power is generated after satisfying all the power requirements of the ammonia plant. This results in a lower total natural gas requirement for this process than any other disclosed ammonia production system. Performance can be as shown in the following example embodiment: feed gas is 250,000 $Nm^3/hr$ hydrogen plus 83,333 $Nm^3/hr$ nitrogen; the total impurity level can be about 50 ppm. The gas stream is at about 25 bar and is preheated in the hydrogen oxy-fuel system to about 167° C.; ammonia production can be about 3039 Mt/day; excess power production can be about 63.8 Mw; heat equivalent with power efficiency of 60% can be about 25.52 million Btu/Mt of $NH^3$.

The terms "about" or "substantially" as used herein can indicate that certain recited values or conditions are intended to be read as encompassing the expressly recited value or condition and also values that are relatively close thereto or conditions that are recognized as being relatively close thereto. For example, unless otherwise indicated herein, a value of "about" a certain number or "substantially" a certain value can indicate the specific number or value as well as numbers or values that vary therefrom (+ or −) by 5% or less, 4% or less, 3% or less, 2% or less, or 1% or less, and any one of such values may be used interchangeably with the words "about" and/or "substantially" as needed for clarity. Similarly, unless otherwise indicated herein, a condition that substantially exists can indicate the condition is met exactly as described or claimed or is within typical manufacturing tolerances or would appear to meet the required condition upon casual observation even if not perfectly meeting the required condition. In some embodiments, the values or conditions can be defined as being express and, as such, the term "about" or "substantially" (and thus the noted variances) can be excluded from the express value.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A hydrogen production system comprising:
    a combustor configured to combust a fuel with oxygen in the presence of a stream comprising predominately carbon dioxide and form a combustion product stream comprising at least carbon dioxide and water;
    a reactor arranged to receive at least a portion of the combustion product stream as a source of convective heating of an endothermic reaction carried out in the reactor, the reaction forming a synthesis gas stream comprising at least hydrogen and carbon monoxide;
    a hydrogen isolation unit arranged to receive at least a portion of the synthesis gas stream and provide at least part of the hydrogen from the synthesis gas stream as a substantially pure hydrogen product stream; and
    a purification unit arranged to receive at least a portion of the combustion product stream after passage through the reactor and provide substantially pure carbon dioxide, at least a portion of which is passed to the combustor in the stream comprising predominately carbon dioxide.

2. The hydrogen production system of claim 1, further comprising at least one shift reactor configured to convert at least a portion of the carbon monoxide in the synthesis gas from the reactor to carbon dioxide and output a shift stream comprising at least hydrogen, carbon dioxide, and waste gas.

3. The hydrogen production system of claim 2, wherein the hydrogen isolation unit comprises an inlet arranged to receive the shift stream, output a pressurized stream of substantially pure hydrogen, and output a stream comprising at least part of the waste gas.

4. The hydrogen production system of claim 3, wherein the hydrogen isolation unit comprises a hydrogen multi-bed pressure swing adsorber (PSA) configured to output the pressurized stream of substantially pure hydrogen and output the stream comprising at least part of the waste gas.

5. The hydrogen production system of claim 4, wherein the hydrogen production system further comprises an ammonia synthesis unit.

6. The hydrogen production system of claim 5, further comprising a line through which at least a portion of the pressurized stream of substantially pure hydrogen is passed to the ammonia synthesis unit.

7. The hydrogen production system of claim 1, wherein the reactor comprises a pressure containment vessel and at least one set of concentrically arranged tubes positioned within the pressure containment vessel, each of the at least one set of concentrically arranged tubes comprising: an outer catalyst tube; an inner reaction product gas tube; and catalyst material positioned within a space defined between an inside surface of the outer catalyst tube and an outside surface of the inner reaction product gas tube.

8. The hydrogen production system of claim 1, further comprising a power producing turbine arranged to receive at least a portion of the synthesis gas stream and expand said stream for power production.

9. The hydrogen production system of claim 1, further comprising a heat exchanger arranged to receive at least a portion of the combustion product stream between the reactor and the purification unit, the heat exchanger being configured to transfer heat from the combustion product stream to one or more further streams.

10. A hydrogen production system comprising:
    a reactor comprising a pressure containment vessel and at least one set of reaction tubes positioned within the pressure containment vessel and arranged to receive reactants for an endothermic reaction that forms a synthesis gas stream comprising at least hydrogen and carbon monoxide, the pressure containment vessel being configured to receive a stream of heated carbon dioxide as a source of convective heating of the endothermic reaction carried out within the at least one set of reaction tubes;
    at least one component effective to process the synthesis gas and deliver a stream of substantially pure hydrogen product; and
    at least one component effective to provide the stream of heated carbon dioxide;
    wherein the at least one set of reaction tubes comprises: an outer catalyst tube; an inner reaction product gas tube; and catalyst material positioned within a space defined between an inside surface of the outer catalyst tube and an outside surface of the inner reaction product gas tube;
    wherein the at least one set of reaction tubes is arranged vertically so that an upper end of the at least one set of reaction tubes defines a hot end where the reactor operates with a higher temperature, and a lower end of the at least one set of reaction tubes defines a cold end where the reactor operates with a lower temperature, relative to the hot end; and
    wherein the reactor comprises a second inlet arranged so that the stream of heated carbon dioxide contacts the hot end of the at least one set of reaction tubes and flows downwardly around an outer surface of the outer catalyst tube toward a second outlet through which the stream of heated carbon dioxide leaves the reactor.

11. The hydrogen production system of claim 10, wherein the reactor further comprises an upper tube sheet that is arranged to functionally align with the outer catalyst tube, and a lower tube sheet that is arranged to functionally align with the inner reaction product gas tube.

12. The hydrogen production system of claim 11, wherein the reactor comprises a first inlet that opens into a space defined between the upper tube sheet and the lower tube sheet, the first inlet being arranged to receive the reactants so that the reactants pass upwardly, from the cold end toward the hot end, through the space within which the catalyst material is positioned.

13. The hydrogen production system of claim 11, wherein the reactor comprises a first outlet for the synthesis gas, the outlet being positioned below the lower tube sheet.

14. The hydrogen production system of claim 10, wherein the at least one component effective to process the synthesis gas and deliver a stream of substantially pure hydrogen product comprises a hydrogen isolation unit.

15. The hydrogen production system of claim 14, wherein the hydrogen isolation unit comprises a hydrogen multi-bed pressure swing adsorber (PSA) configured to output a pressurized stream of substantially pure hydrogen and output a stream comprising a waste gas.

16. The hydrogen production system of claim 14, wherein the at least one component effective to process the synthesis gas and deliver a stream of substantially pure hydrogen product comprises at least one shift reactor configured to convert at least a portion of the carbon monoxide in the synthesis gas from the reactor to carbon dioxide and output a shift stream comprising at least hydrogen, carbon dioxide, and waste gas, the at least one shift reactor being positioned between the reactor and the hydrogen isolation unit.

17. The hydrogen production system of claim 10, wherein the at least one component effective to provide the stream of heated carbon dioxide is a combustor configured to combust a fuel with oxygen in the presence of a stream comprising predominately carbon dioxide and form a combustion product stream that defines the stream of heated carbon dioxide.

18. The hydrogen production system of claim 17, further comprising one or more components configured to direct at least a portion of the stream of heated carbon dioxide leaving the reactor to the combustor in the stream comprising predominately carbon dioxide.

19. The hydrogen production system of claim 10, wherein the upper end of the at least one set of reaction tubes defines a filling tube with a removable plug.

\* \* \* \* \*